United States Patent
Thomson et al.

(10) Patent No.: US 12,497,593 B2
(45) Date of Patent: Dec. 16, 2025

(54) GENERATION OF HEMATOPOIETIC PROGENITOR CELLS FROM HUMAN PLURIPOTENT STEM CELLS

(71) Applicant: Wisconsin Alumni Research Foundation, Madison, WI (US)

(72) Inventors: James A. Thomson, Madison, WI (US); Jue Zhang, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 234 days.

(21) Appl. No.: 16/563,190

(22) Filed: Sep. 6, 2019

(65) Prior Publication Data

US 2020/0080059 A1  Mar. 12, 2020

Related U.S. Application Data

(60) Provisional application No. 62/728,408, filed on Sep. 7, 2018.

(51) Int. Cl.
| | |
|---|---|
| A61K 40/11 | (2025.01) |
| A61K 40/15 | (2025.01) |
| A61K 40/22 | (2025.01) |
| A61K 40/32 | (2025.01) |
| A61K 40/41 | (2025.01) |
| A61K 40/42 | (2025.01) |
| C12N 5/0783 | (2010.01) |
| C12N 5/0786 | (2010.01) |
| C12N 5/0789 | (2010.01) |

(52) U.S. Cl.
CPC ............ *C12N 5/0647* (2013.01); *A61K 40/11* (2025.01); *A61K 40/15* (2025.01); *A61K 40/22* (2025.01); *A61K 40/32* (2025.01); *A61K 40/418* (2025.01); *A61K 40/42* (2025.01); *C12N 5/0636* (2013.01); *C12N 5/0645* (2013.01); *C12N 5/0646* (2013.01); *C12N 2501/115* (2013.01); *C12N 2501/125* (2013.01); *C12N 2501/145* (2013.01); *C12N 2501/165* (2013.01); *C12N 2501/2303* (2013.01); *C12N 2501/42* (2013.01); *C12N 2501/999* (2013.01); *C12N 2506/02* (2013.01); *C12N 2506/45* (2013.01)

(58) Field of Classification Search
CPC ............ C12N 5/0647; C12N 2501/115; C12N 2501/125; C12N 2501/145; C12N 2501/165; C12N 2501/2303; C12N 2501/42; C12N 2501/999; C12N 2506/02; C12N 2506/45; C12N 5/0636; C12N 5/0645; C12N 5/0646; A61K 40/11; A61K 40/15; A61K 40/22; A61K 40/32; A61K 40/418; A61K 40/42
See application file for complete search history.

(56) References Cited

U.S. PATENT DOCUMENTS

| | | | |
|---|---|---|---|
| 6,143,292 A | 11/2000 | Slavin | |
| 6,326,198 B1 | 12/2001 | Emerson | |
| 6,383,481 B1 | 5/2002 | Ikehara | |
| 6,441,053 B1* | 8/2002 | Klein | A61K 31/404 424/610 |
| 6,447,765 B1 | 9/2002 | Horwitz | |
| 6,916,654 B1 | 7/2005 | Sims | |
| 8,268,620 B2 | 9/2012 | Thomson | |
| 8,440,461 B2 | 5/2013 | Thomson | |
| 9,938,499 B2 | 4/2018 | Slukvin | |
| 2011/0027886 A1 | 2/2011 | Han et al. | |
| 2013/0217117 A1 | 8/2013 | Thomson | |
| 2014/0057355 A1 | 2/2014 | Thomson | |
| 2014/0134195 A1 | 5/2014 | Russell | |
| 2014/0248696 A1* | 9/2014 | Zhang | C12N 5/0623 435/366 |
| 2016/0186137 A1 | 6/2016 | Thomson et al. | |
| 2016/0244719 A1 | 8/2016 | Thomson | |
| 2017/0130202 A1 | 5/2017 | Nakahata et al. | |
| 2017/0240861 A1* | 8/2017 | Murry | A61K 35/545 |

FOREIGN PATENT DOCUMENTS

| | | | | |
|---|---|---|---|---|
| JP | 2010-213576 | 9/2010 | | |
| JP | 2015-519890 | 7/2015 | | |
| JP | 2015-522290 | 8/2015 | | |
| JP | 2016-512031 | 4/2016 | | |
| JP | 2016-512960 | 5/2016 | | |
| WO | 1998045479 | 10/1998 | | |
| WO | 2010096746 | 8/2010 | | |
| WO | WO-2010096746 A1 * | 8/2010 | ........... | C12N 5/0647 |
| WO | WO2013/163171 | 10/2013 | | |
| WO | WO2014/013255 | 1/2014 | | |
| WO | WO2014/134412 | 9/2014 | | |
| WO | WO2014/165131 | 10/2014 | | |
| WO | 2016114723 | 7/2016 | | |

(Continued)

OTHER PUBLICATIONS

Wang et al ("TGFβ inhibition enhances the generation of hematopoietic progenitors from human ES cell-derived hemogenic endothelial cells using a stepwise strategy," Cell Research (2012) 22:194-207).*

Wang et al 2009 ("WNT and BMP signaling are both required for hematopoietic cell development from human ES cells," Stem Cell Research vol. 3, Issues 2-3, Sep.-Nov. 2009, pp. 113-125.*

Kennedy et al ("Development of the hemangioblast defines the onset of hematopoiesis in human ES cell differentiation culture," Blood, Apr. 1, 2007, vol. 109, No. 7).*

Lengerke et al ("Hematopoietic Development from Human Induced Pluripotent Stem Cell," Hematopoietic Stem Cells VII: Ann. N.Y. Acad. Sci. 1176: 219-227 (2009).*

(Continued)

*Primary Examiner* — Peter Paras, Jr.
*Assistant Examiner* — Gillian C. Reglas
(74) *Attorney, Agent, or Firm* — McDonnell Boehnen Hulbert & Berghoff LLP

(57) ABSTRACT

Methods for generating and using hematopoietic progenitor cells are described.

8 Claims, 9 Drawing Sheets
(9 of 9 Drawing Sheet(s) Filed in Color)

(56) References Cited

FOREIGN PATENT DOCUMENTS

| WO | 2016123100 | 8/2016 |
|---|---|---|
| WO | 2015199127 | 4/2017 |
| WO | WO2017078807 | 5/2017 |
| WO | WO2018/146297 | 8/2018 |

OTHER PUBLICATIONS

Huang et al ("Haematopoietic differentiation is inhibited when Notch activity is enhanced in FLK1+ mesoderm progenitors," Stem Cell Research (2013) 11, 1273-1287).*
Cerdan et al ("Novel roles for Notch, Wnt and Hedgehog in hematopoesis derived from human pluripotent stem cells," Int. J. Dev. Biol. 54: 955-964 (2010).*
Heinz et al ("Comparison of Different Cytokine Conditions Reveals Resveratrol as a New Molecule for Ex Vivo Cultivation of Cord Blood-Derived Hematopoietic Stem Cells," Stem Cells Translational Medicine 2015;4:1064-1072) (Year: 2015).*
Zhang et al ("Functional characterization of human pluripotent stem cell-derived arterial endothelial cells," PNAS E6072-E6078| Published online Jul. 10, 2017) (Year: 2017).*
Pearson S, et al. The stepwise specification of embryonic stem cells to hematopoietic fate is driven by sequential exposure to Bmp4, activin A, bFGF and VEGF. Development. Mar. 13, 2008; 135(8):1525-35. doi: 10.1242/dev.011767. (Year: 2008).*
Bai H, et al. The balance of positive and negative effects of TGF-β signaling regulates the development of hematopoietic and endothelial progenitors in human pluripotent stem cells. Stem Cells Dev. Jun. 13, 2013;22(20):2765-76. doi: 10.1089/scd.2013.0008. (Year: 2013).*
Heinz N, et al. Comparison of Different Cytokine Conditions Reveals Resveratrol as a New Molecule for Ex Vivo Cultivation of Cord Blood-Derived Hematopoietic Stem Cells. Stem Cells Transl Med. Jul. 9, 2015; 4(9):1064-72. doi: 10.5966/sctm.2014-0284 (Year: 2015).*
International Search Report for PCT/US2019/049955, dated Jan. 27, 2020.
Wang et al. TGF[beta] inhibition enhances the generation of hematopoietic progenitors from human ES cell-derived hemogenic endothelial cells using a stepwise strategy. Cell Research. 2011. vol. 22, No. 1: 194-207.
Pearson et al. The STepwise specification of embryonic stem cells to hematopoietic fate is driven by sequential exposure to Bmp4, activin A, bFGF and FEGF. Development. 2008. vol. 135, No. 8: 1525-1535.
Baba, Y. et al. Constitutively active ß-catenin confers multi-lineage differentiation potential on lymphoid and myeloid progenitors. Immunity 23:599-609 (2005).
Berridge, M. J., et al. "Neural and developmental actions of lithium: a unifying hypothesis." Cell 59.3 (1989): 411-419.
Bray, S.J. (2016). Notch signalling in context. Nat Rev Mol Cell Biol 17, 722-735.
Challa-Malladi, M., et al. "Combined genetic inactivation of β2-Microglobulin and CD58 reveals frequent escape from immune recognition in diffuse large B cell lymphoma." Cancer cell 20.6 (2011): 728-740.
Chen, G., et al. "Chemically defined conditions for human iPSC derivation and culture." Nature methods 8.5 (2011): 424.
Deuse et al., "Hypoimmunogenic derivatives of induced pluripotent stem cells evade immune rejection in fully immunocompetent allogenic recipients," Nature Biotechnology, vol. 37, 252-258, 2019.

Ebert, A. D., et al. "Induced pluripotent stem cells from a spinal muscular atrophy patient." Nature 457.7227 (2009): 277.
GenBank: AAH11177.2 VEGFA protein, partial [*Homo sapiens*], Nov. 3, 2008.
GenBank: AAH65522.2 Vegfa protein, partial [*Homo sapiens*], Nov. 3, 2008.
GenBank: CAA61107.1, beta-catenin [*Homo sapiens*], Oct. 7, 2008.
GenBank: X87838, *H.sapiens* mRNA for beta-catenin, Oct. 7, 2008.
Goldman, D. C., et al. "BMP4 regulates the hematopoietic stem cell niche." Blood 114.20 (2009): 4393-4401.
Gornalusse, G. G., et al. "HLA-E-expressing pluripotent stem cells escape allogeneic responses and lysis by NK cells." Nature biotechnology 35.8 (2017): 765.
Hagen, T., et al. "Expression and characterization of GSK-3 mutants and their effect on ß-catenin phosphorylation in intact cells." Journal of Biological Chemistry 277.26 (2002): 23330-23335.
Handgretinger, R., et al. (2018). The potential role of gammadelta T cells after allogeneic HCT for leukemia. Blood 131, 1063-1072.
Howden, S. E., et al. "Genetic correction and analysis of induced pluripotent stem cells from a patient with gyrate atrophy." Proceedings of the National Academy of Sciences 108.16 (2011): 6537-6542.
Inman, G. J., et al. "SB-431542 is a potent and specific inhibitor of transforming growth factor-ß superfamily type I activin receptor-like kinase (ALK) receptors ALK4, ALK5, and ALK7." Molecular pharmacology 62.1 (2002): 65-74.
June, et al., "CAR T cell immunotherapy for human cancer," Science, 359, 1361-1365, 2018.
Knorr, D.A., et al. (2013). Clinical-scale derivation of natural killer cells from human pluripotent stem cells for cancer therapy. Stem Cells Transl Med 2, 274-283.
Lis, R., et al. (2017). Conversion of adult endothelium to immunocompetent haematopoietic stem cells. Nature 545, 439-445.
Lu, B., et al. "Long-term safety and function of RPE from human embryonic stem cells in preclinical models of macular degeneration." Stem cells 27.9 (2009): 2126-2135.
Mehta, R.S., et al. (2018). Chimeric Antigen Receptor Expressing Natural Killer Cells for the Immunotherapy of Cancer. Front Immunol 9, 283.
Pan, D. (2010). The hippo signaling pathway in development and cancer. Dev Cell 19, 491-505.
Riolobos, L., et al. "HLA engineering of human pluripotent stem cells." Molecular Therapy 21.6 (2013): 1232-1241.
Sugimura, R., et al. (2017). Haematopoietic stem and progenitor cells from human pluripotent stem cells. Nature 545, 432-438.
Thomson, J. A., et al. "Embryonic stem cell lines derived from human blastocysts." science 282.5391 (1998): 1145-1147.
Wang, Y., et al. (2009). WNT and BMP signaling are both required for hematopoietic cell development from human ES cells. Stem Cell Res 3, 113-125.
Wu, D., et al. (2017). Human gammadeltaT-cell subsets and their involvement in tumor immunity. Cell Mol Immunol 14, 245-253.
Yu, J., et al. "Human induced pluripotent stem cells free of vector and transgene sequences." Science 324.5928 (2009): 797-801.
Yu, J., et al. "Induced pluripotent stem cell lines derived from human somatic cells." science 318.5858 (2007): 1917-1920.
Zhang, J., et al. (2017). Functional characterization of human pluripotent stem cell-derived arterial endothelial cells. Proc Natl Acad Sci U S A 114, E6072-E6078.
Vereide et al., "An expandable, inducible hemangioblast state regulated by fibroblast growth factor," Stem Cell Reports, 3(6): 1043-57 (2014).

* cited by examiner

GENERATION OF HEMATOPOIETIC PROGENITOR CELLS FROM HUMAN PLURIPOTENT STEM CELLS

CROSS-REFERENCE TO RELATED APPLICATIONS

This application claims priority to U.S. Provisional Patent Application No. 62/728,408 filed Sep. 7, 2019, which is incorporated herein by reference in its entirety.

STATEMENT REGARDING FEDERALLY SPONSORED RESEARCH

This invention was made with government support under HL034655 awarded by the National Institutes of Health. The government has certain rights in the invention.

BACKGROUND

The generation of hematopoietic progenitor cells is a promising approach for treatment of blood disorders but this goal remains challenging. In two recent studies, hematopoietic cells capable of engraftment in immune-compromised mice were generated using transgenic methods (Lis et al., 2017; Sugimura et al., 2017). However, transgenic methods cannot be scaled up for clinical applications. The art is in need of large-scale, clinically applicable methods for producing hematopoietic progenitor cells capable of engraftment in an animal or human subject.

SUMMARY OF THE INVENTION

In a first aspect, described herein is a method for obtaining hematopoietic progenitor cells, the method comprising culturing mesoderm cells seeded at low density in a chemically-defined culture medium that comprises a fibroblast growth factor (FGF), a vascular endothelial growth factor (VEGF), and at least one of a Notch agonist, a TGFβ inhibitor, and an inhibitor of inositol monophosphatase, whereby a cell population comprising hemangioblast cells is obtained; and culturing the hemangioblast cells in a chemically-defined culture medium that comprises insulin, a FGF, a VEGF, and a Notch agonist, whereby a cell population comprising CD34+ CD45+ hematopoietic progenitor cells is obtained. In some embodiments, the mesoderm cells are seeded at a density between about $6 \times 10^3$ cells/cm$^2$ and about $6 \times 10^4$ cells/cm$^2$. In some embodiments, the mesoderm cells express one or more mesodermal marker selected from the group consisting of Brachyury (T), EMOS, FOXA2, MIXL1, MSX1, and MSX2. In some embodiments, the Notch agonist is selected from the group consisting of Resveratrol (3,4',5-trihydroxystilbene), valproic acid, and suberoyl bishydroxamic acid. In some embodiments, the TGFβ inhibitor is SB431542. In some embodiments, the inhibitor of inositol monophosphatase is L-690,330.

In some embodiments, the mesodermal cells are obtained by culturing human pluripotent stem cells for a period of about two days in a serum-free, albumin-free chemically-defined cell culture medium comprising Bone Morphogenetic Protein 4 (BMP4), Activin A, and an activator of Wnt/β-catenin signaling to obtain a cell population comprising mesodermal cells. In some embodiments, the human pluripotent stem cells are selected from the group consisting of embryonic stem cells and induced pluripotent stem cells. In some embodiments, the pluripotent stem cells are seeded at a density between about $6 \times 10^3$ cells/cm$^2$ and about $6 \times 10^4$ cells/cm$^2$. In some embodiments, the activator of Wnt/β-catenin signaling is a Gsk3 inhibitor. In some embodiments, the Gsk3 inhibitor is selected from the group consisting of CHIR99021, CHIR98014, BIO-acetoxime, BIO, LiCl, SB216763, SB415286, AR A014418, 1-Azakenpaullone, and Bis-7-indolylmaleimide. In some embodiments, the mesoderm cells are cultured for about 4 days followed by culture of the hemangioblast cells for about 4 days to produce a population of cells comprising hematopoietic progenitor cells.

In a second aspect, described herein is a substantially pure, isolated population of CD34+ CD45+ hematopoietic progenitor cells obtained according to the methods described herein. In some embodiments, the isolated population comprises at least 90% hematopoietic progenitor cells. In some embodiments, the isolated population comprises at least 99% hematopoietic progenitor cells.

In a third aspect, described herein is a substantially pure, isolated population of pluripotent stem cell-derived CD34+ CD45+ hematopoietic progenitor cells obtained according to the methods described herein.

In a fourth aspect, described herein is a method for treating a blood disease in a patient, comprising administering to the patient a therapeutic dose of CD34+ CD45+ hematopoietic progenitor cells obtained according to the methods described herein. In some embodiments, the disease is selected from the group consisting of anemia, thalassemia, polycythemia, uremia, myelofibrosis, myeloma, myelodysplasia, leukemia, lymphoma, myelodysplastic syndrome, hemoglobinopathy, neutropenia, thrombocytopenia, Von Willebrand disease, hemophilia, primary thrombocythemia, an acquired platelet function disorder, a plasma cell disorder, and a solid tumor. In some embodiments, the hematopoietic progenitor cells are administered in a formulation, and wherein the formulation is in a form for intravenous delivery.

In a fifth aspect, described herein is a method for obtaining macrophages, the method comprising (i) culturing the CD34+ CD45+ hematopoietic progenitor cells produced by the methods described herein in medium comprising granulocyte-macrophage colony-stimulating factor (GM-CSF) for about 3 days; and (ii) culturing the cultured cells of (i) in medium comprising interleukin-1 beta (IL-1B), macrophage colony stimulating factor (M-CSF), and serum or serum replacement, whereby a cell population comprising macrophages is obtained. In some embodiments, the cell population comprises at least 80% CD11b$^+$ CD14$^+$ macrophages.

In a sixth aspect, described herein is a method of obtaining Natural Killer (NK) cells, the method comprising culturing the CD34+ CD45+ hematopoietic progenitor cell population produced by the methods described herein in medium comprising bovine serum albumin, insulin, and transferrin for about 3 days to produce a population of cells, the population comprising attached cells and floating cells; and culturing the floating cells in medium comprising interleukin-7 (IL-7), interleukin-15 (IL-15), stem cell factor (SCF), and Flt3-ligand (FLT3-L), whereby a population of cells comprising NK cells is produced. In some embodiments, the population of cells comprising NK cells comprises at least 60% CD56$^+$ CD3$^-$ NK cells. In some embodiments, the floating cells are cultured in medium that additionally comprises serum or serum replacement.

In a seventh aspect, described herein is a method of obtaining T cells, the method comprising culturing the CD34+ CD45+ hematopoietic progenitor cells produced by the methods described herein in medium comprising interleukin-7 (IL-7), Flt3-ligand (FLT3-L), stem cell factor (SCF), and RESV to produce a population of cells comprising T cells. In some embodiments, the population of cells comprises at least about 90% CD3$^+$ CD4$^+$ CD8$^+$ T cells. In some embodiments, the medium additionally comprises serum or serum replacement.

INCORPORATION BY REFERENCE

All publications, patents, and patent applications mentioned in this specification are herein incorporated by reference to the same extent as if each individual publication, patent, and patent application was specifically and individually indicated to be incorporated by reference.

BRIEF DESCRIPTION OF DRAWINGS

The patent or patent application file contains at least one drawing in color. Copies of this patent or patent application publication with color drawings will be provided by the Office upon request and payment of the necessary fee.

FIG. 1A shows a schematic of in vitro differentiation of pluripotent cells into arterial endothelial cells and hematopoietic cells, where the pluripotent cells are plated at high or low cell density. Cells in high cell density methods of the experiments depicted in this figure were plated at $1.1\times10^5$ cells/cm$^2$. Cells in low cell density methods of the experiments depicted in this figure were plated at $1.8\times10^4$ cells/cm$^2$. The photographs of FIG. 1B show cell morphology of cells of each culture at day 10. Round floating cells were observed in low cell density culture methods. FIG. 1C shows flow cytometry analysis of CD34 and CD45 expression in cells from the low cell density culture at day 0 and day 10. FIG. 1D shows flow cytometry analysis of CD144 expression from each of the low cell density (LD) and high cell density (HD) cultures at day 10. FIG. 1E shows total hematopoietic cell number (floating cells) at day 10 generated from three pluripotent cell lines—H1 (ES), H9 (ES), or PBMC-3-1 (iPS) cells in 1 well of a 12-well plate. FIG. 1F shows total hematopoietic cell number (floating cells) generated from 1 NUNC Triple-Flask. The hematopoietic cells could be cryopreserved at day 10 (90% FBS+10% DMSO) and hemangioblasts can be cryopreserved at day 6.

FIGS. 2A-2B show immunostaining of YAP and NICD1 (Notch intra-cellular domain). FIG. 2C shows morphology of cells at day 10 in high density culture. Cells cultured at high density were treated with or without 10 μM DAPT (a Notch inhibitor) from day 2-10. FIG. 2D shows statistics of total hematopoietic cell number (floating cells) generated under high-density conditions in absence or presence of 10 μM DAPT from day 2-10.

FIG. 3A shows immunostaining of pSMAD1/5/8. FIG. 3B shows a Western blot of phosphorylated SMAD1/5/8 (pSMAD1/5/8), SMAD1/5/8, and GAPDH from cells cultured at either low density (LD) or high density (HD). FIG. 3C shows a photograph of cell morphology at day 10. Cells were cultured at high density with or without 50 ng/ml BMP4. FIG. 3D shows a photograph of cell morphology at day 10. Cells were cultured at low density with or without LDN (a BMP signaling inhibitor). FIG. 3E shows statistics of total hematopoietic cell number.

FIG. 5A shows a schematic of macrophage/microglia differentiation. FIG. 5B shows flow cytometry analysis of CD14 and CD11b expression at day 19 of cells cultured as shown in FIG. 5A in the presence of fetal bovine serum (FBS) or knockout serum replacement (KOSR). FIG. 5C shows a photograph of cell morphology at day 19 of cells cultured with FBS or KOSR starting at day 13. FIG. 5D shows phagocytosis by microglia/macrophage. Zymosan A (S. cerevisiae) BioParticles® (Texas Red® conjugate; Life Technologies) were prepared in PBS (10 mg/ml=2×10$^9$ particle/ml). 20 μl particles were added to 2 ml E6M medium containing 4×10$^5$ macrophages. Phagocytosis was imaged over time.

FIG. 6A shows a schematic of NK cell differentiation. FIG. 6B shows flow cytometry analysis of CD56 and CD3 expression at day 27 of cells differentiated from hematopoietic progenitor cells made from H1, H9, and PBMC-3-1 cell lines. FIG. 6C shows cell killing statistics of an NK killing assay. H1-NK cell: U936/K572=1:1. Live U936 or K572 cells were analyzed 24 hours later.

FIG. 7A shows a schematic of T cell differentiation. FIG. 7B shows flow cytometry analysis of CD3, CD4, and CD8 expression at day 34.

FIG. 8A shows flow cytometry analysis of human CD45 (hCD45) and mouse CD45 (mCD45) expression in peripheral blood 8 weeks after injection. Intravenous injection (retro-orbital) was performed on NBSGW mouse, 3×10$^5$ cells (in 100 ul HBSS)/mouse. Peripheral blood was collected 8 weeks post injection. FIG. 8B shows statistics of hCD45$^+$ cells present in mouse peripheral blood. FIG. 8C shows a comparison of H1 (male ESC) and H9 (female ESC) derived hematopoietic progenitor cells, which were injected into the intra-femoral artery of NBSGW mice at a dosage of 4.5×10$^5$ cells (in 30 ul HBSS)/mouse. Peripheral blood was collected 12 weeks post injection. "D10" indicates cells that were cryopreserved at day 10. One day before transplantation, cells were thawed and cultured in SEFM+100 ng/ml SCF for 24 hours. After 24 hours, only floating HPCs were collected for transplant. "D6" indicates cells that were cryopreserved at day 6. One day before transplantation, cells were thawed and cultured in SEFM+100 ng/ml SCF for 24 hours. After 24 hours, both floating HPCs and attached hemangioblasts were collected for transplant. Statistics of hCD45$^+$ cells were shown.

DETAILED DESCRIPTION OF THE INVENTION

Figures 1A, 1B, 1C, 1D, 1E, 1F:
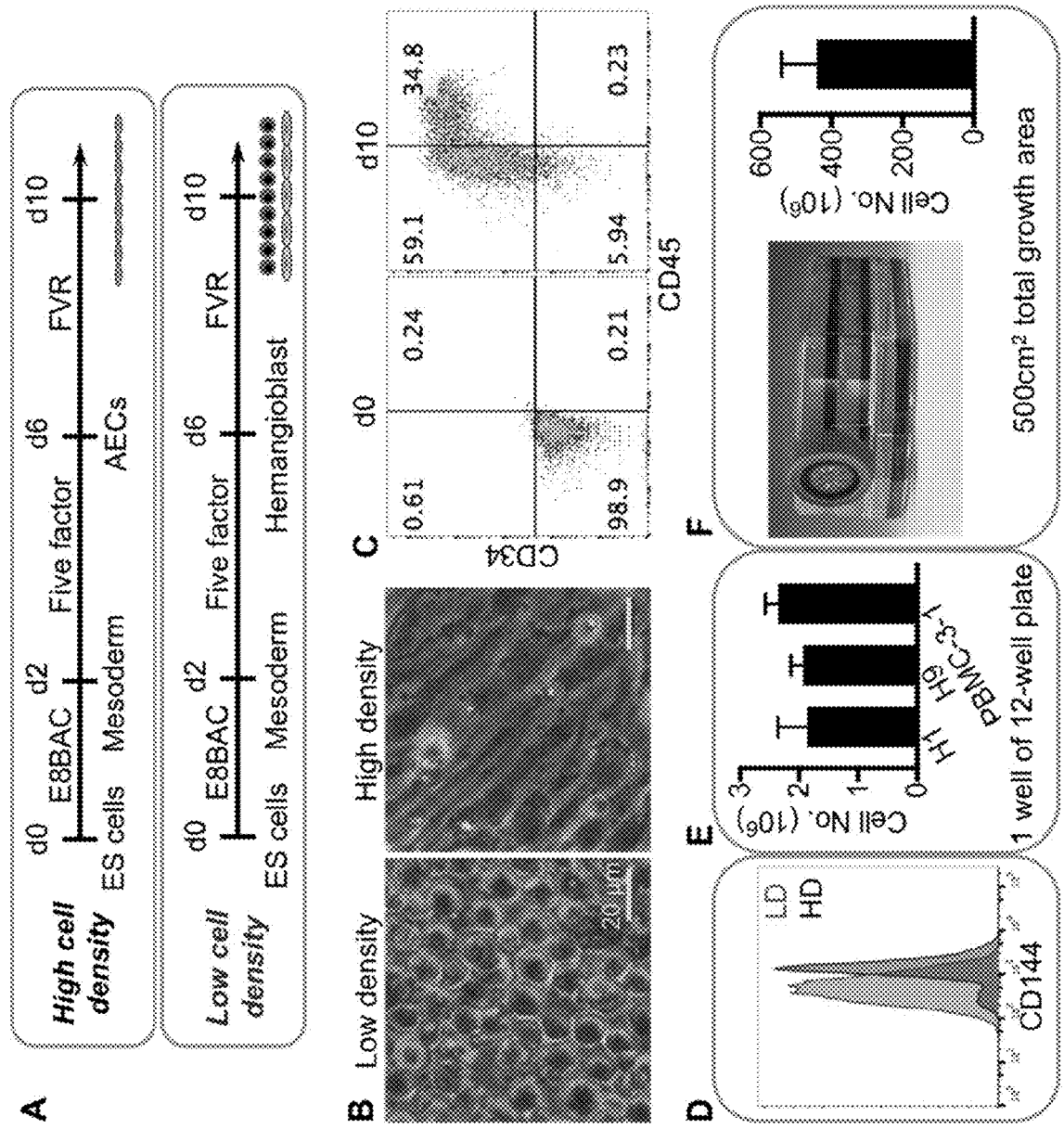
FIGS. 1A-1F concern hematopoietic cell differentiation in accord with the invention.

The present invention is based, at least in part, on the Inventors' development of protocols for differentiating human pluripotent stem cells into hematopoietic progenitor cells (HPC) under albumin-free, xenogeneic material-free ("xeno-free"), chemically-defined conditions. The pluripotent cells can be human embryonic stem cells (human ES cells or hES cells) or human induced pluripotent stem cells (human iPS cells or hiPS cells). In particular, when the pluripotent cells are seeded in such media at low cell density, populations of CD34$^+$/CD45$^+$ hematopoietic progenitor cells can be generated. Based on these discoveries, the present invention provides fully defined and xeno-free methods for producing and expanding clinically relevant human hematopoietic progenitor cells for use in clinical cell therapies and tissue modeling applications. As used herein, the term "hematopoietic progenitor cells" refers to cells that, in vivo and in vitro, give rise to cells of the myeloid and lymphoid lineages of blood cells via hematopoiesis which may be tracking by providing a maker that is retained in the myeloid or lymphoid lineage cells produced and that are obtained according to an in vitro method provided herein. While some naturally occurring HPCs are lineage-committed and can only differentiate into one cell type, the HPCs of the present invention are multipotent and are characterized as capable of differentiating into cells of both the myeloid and lymphoid lineages. HPCs of the present invention are characterized by high levels of expression of hematopoietic progenitor cell markers such as CD34 and CD45. HPCs are also characterized by expression of markers CD34, CD43, CD49f, and CD90. HPCs are distinguishable from other cell types on the basis of characteristic expression profiles and functional attributes of the cells in vitro and in vivo as described herein. Specifically, HPCs of the present invention are able to engraft after transplantation.

The present invention also provides methods of producing macrophages, Natural Killer (NK) cells, and T cells from hematopoietic progenitor cells produced by the methods described herein.

Method

In certain preferred embodiments, HPCs are obtained from mesodermal cells produced from pluripotent cells as described herein. HPCs can also be obtained from mesodermal cells made using other methods, but such methods are less efficient and fewer HPCs are obtained.

In a first aspect, provided herein is a method of obtaining HPCs. In exemplary embodiments, the method comprises a first step of directing differentiation of mesodermal cells into hemangioblast cells and a second step of directing differentiation of hemangioblast cells into hematopoietic progenitor cells.

In exemplary embodiments of the first step, mesodermal cells are seeded at low density and cultured in a medium to produce hemangioblast cells. In some cases, a mesodermal cell (including, in some cases, a pluripotent stem-cell derived mesodermal cell) is cultured in medium that comprises, or consists essentially of, an FGF and a VEGF in amounts effective and for a length of time sufficient to direct differentiation of a mesodermal cell to a hemangioblast cell. In some cases, a mesodermal cell (including, in some cases, a pluripotent stem-cell derived mesodermal cell) is cultured in medium that comprises, or consists essentially of, an FGF, a VEGF, a Notch agonist, a TGFβ receptor inhibitor, and an inhibitor of inositol monophosphatase in amounts effective and for a length of time sufficient to direct differentiation of a mesodermal cell to a hemangioblast cell. Mesoderm cells are cultured in the culture medium for about four days (e.g., 3 days, 4 days, or 5 days). In some embodiments the culture medium comprises, or consists essentially of, one or more of a FGF, a VEGF, an inhibitor of TGFβ signaling (e.g., SB-431542), Resveratrol (RESV), and an inhibitor of inositol monophosphatase, where culturing occurs for a length of time sufficient for the cultured mesoderm cells to differentiate into hemangioblast cells. In some embodiments, the cell culture medium used to differentiate mesoderm cells into hemangioblasts comprises each of these components. In some embodiments, mesodermal cells are seeded at low density and cultured in chemically-defined culture medium comprising or consisting essentially of DMEM/F12 culture medium, L-ascorbic acid-2-phosphate magnesium, sodium selenium, NaHCO$_3$, transferrin, FGF2, VEGF-A, SB431542, RESV, and L690,330 for about four days. Preferably, the culture medium comprises or consists essentially of DMEM/F12 medium, L-ascorbic acid-2-phosphate magnesium (64 ng/ml), sodium selenium (14 ng/ml), NaHCO$_3$ (543 µg/ml), transferrin (10.7 µg/ml), FGF2 (100 ng/ml), VEGF-A (50 ng/ml), SB431542 (10 µM), RESV (5 µM), and L690 (10 µM). Culturing can take place on any appropriate surface (e.g., in two-dimensional or three-dimensional culture).

In some embodiments of the first step, mesodermal cells are seeded at high density and cultured in a medium to produce hemangioblast cells. In some cases, a mesodermal cell (including, in some cases, a pluripotent stem-cell derived mesodermal cell) is cultured in medium that comprises, or consists essentially of, Bone Morphogenetic Protein 4 (BMP4), an FGF, a VEGF, a Notch agonist, a TGFβ receptor inhibitor, and an inhibitor of inositol monophosphatase in amounts effective and for a length of time sufficient to direct differentiation of a mesodermal cell to a hemangioblast cell. Mesoderm cells are cultured in the culture medium for about four days (e.g., 3 days, 4 days, or 5 days). In some embodiments the culture medium comprises, or consists essentially of, one or more of, BMP4, a FGF, a VEGF, an inhibitor of TGFβ signaling (e.g., SB-431542), Resveratrol (RESV), and an inhibitor of inositol monophosphatase, where culturing occurs for a length of time sufficient for the cultured mesoderm cells to differentiate into hemangioblast cells. In some embodiments, the cell culture medium used to differentiate mesoderm cells into hemangioblasts comprises each of these components. In some embodiments, mesodermal cells are seeded at low density and cultured in chemically-defined culture medium comprising or consisting essentially of DMEM/F12 culture medium, L-ascorbic acid-2-phosphate magnesium, sodium selenium, NaHCO$_3$, transferrin, BMP4, FGF2, VEGF-A, SB431542, RESV, and L690,330 for about four days. Preferably, the culture medium comprises or consists essentially of DMEMIF12 medium, L-ascorbic acid-2-phosphate magnesium (64 ng/ml), sodium selenium (14 ng/ml), NaHCO$_3$ (543 µg/ml), transferrin (10.7 µg/ml), BMP4 (50 ng/ml), FGF2 (100 ng/ml), VEGF-A (50 ng/ml), SB431542 (10 µM), RESV (5 µM), and L690 (10 µM). Culturing can take place on any appropriate surface (e.g., in two-dimensional or three-dimensional culture).

Mesodermal cells are typically cultured in a culture medium that is free, substantially free, or essentially free of insulin, albumin, or any component derived from a non-human animal (i.e., free of xenogeneic material). As used herein, the term "substantially free" refers to cell culture conditions substantially devoid of a certain component or reagent. Substantially free of insulin means the medium contains less than $2 \times 10^{-5}$% insulin by weight, and preferably contains less than $1 \times 10^{-5}$%, less than $0.5 \times 10^{-5}$%, less than $0.2 \times 10^{-5}$% or less than $0.1 \times 10^{-5}$% insulin.

As used herein, the terms "mesodermal cell" and "mesoderm cell" are used interchangeably and refer to a cell having mesoderm-specific gene expression and being capable of differentiating into a mesodermal lineage such as bone, muscle, such as cardiac muscle, skeletal muscle and smooth muscle (e.g., of the gut), connective tissue such as the dermis and cartilage, kidneys, the urogenital system, blood or hematopoietic cells, heart and vasculature. Mesoderm-specific biomarkers include Brachyury (T), EMOS, FOXA2, MIXL1, MSX1, and MSX2.

As used herein, the term "seeded at low density," or "cultured at low density," refers to a cell culture seeded at a density of between about $6 \times 10^3$ cells/cm$^2$ and about $6 \times 10^4$ cells/cm$^2$. In some embodiments, the low seeding density is about $1.0 \times 10^4$. In some embodiments, the low seeding density is about $2.0 \times 10^4$.

As used herein, the term "seeded at high density," or "cultured at high density," refers to a cell culture seeded at a density above $6 \times 10^4$ cells/cm$^2$ and up to $3 \times 10^5$ cells/cm$^2$.

In exemplary embodiments of the second step, hemangioblast cells are cultured in medium to produce a population of cells including hematopoietic progenitor cells. A suitable second step culture medium comprises, or consists essentially of, insulin, a FGF, a VEGF, and a Notch agonist in amounts effective to and for a length of time sufficient to direct differentiation of a hemangioblast cell to a hematopoietic progenitor cell. Hemangioblasts are cultured in the culture medium for about 4 days. In some embodiments, the hemangioblasts are cultured in chemically-defined medium comprising or consisting essentially of DMEM/F12 culture medium, L-ascorbic acid-2-phosphate magnesium, sodium selenium, NaHCO$_3$, transferrin, insulin, FGF2, VEGF, and RESV for about four days. In some embodiments, the culture medium comprises or consists essentially of DMEM/F12 medium, L-ascorbic acid-2-phosphate magnesium (64 ng/ml), sodium selenium (14 ng/ml), NaHCO$_3$ (543 µg/ml), transferrin (10.7 µg/ml), insulin (20 µg/ml), FGF2 (100 ng/ml), VEGF-A (50 ng/ml), and RESV (5 µM). In some embodiments, the second step culture medium additionally comprises Bone Morphogenetic Protein 4 (BMP4), WNT3A, or combinations thereof to increase the purity of the CD34$^+$/CD45$^+$ cell population produced. In some embodiments, about 50 ng/ml BMP4, about 50 ng/ml WNT3A, or combinations thereof are added to the culture medium. Culturing can take place on any appropriate surface (e.g., in two-dimensional or three-dimensional culture). The population of cells produced by culturing hemangioblasts as described includes attached cells that adhere to the culture surface and floating hematopoietic progenitor cells. The floating hematopoietic progenitor cells are characterized by a round morphology.

In exemplary embodiments of the second step, hemangioblast cells are cultured in medium to produce a population of cells including hematopoietic progenitor cells. A suitable second step culture medium comprises, or consists essentially of, stem cell factor (SCF), IL-3, and thrombopoietin (TPO) in amounts effective to, and for a length of time sufficient to, direct differentiation of a hemangioblast cell to a hematopoietic progenitor cell. Hemangioblasts are cultured in the culture medium for about 4 days. In some embodiments, the hemangioblasts are cultured in chemically-defined medium comprising or consisting essentially of DMEM/F12 culture medium, L-ascorbic acid-2-phosphate magnesium, sodium selenium, NaHCO$_3$, transferrin, insulin, SCF, IL-3, and TPO for about four days. In some embodiments, the culture medium comprises or consists essentially of DMEM/F12 medium, L-ascorbic acid-2-phosphate magnesium (64 ng/ml), sodium selenium (14 ng/ml), NaHCO$_3$ (543 µg/ml), transferrin (10.7 µg/ml), insulin (20 µg/ml), SCF (50 ng/ml), IL-3 (50 ng/ml), and TPO (50 ng/ml). In some embodiments, the second step culture medium additionally comprises Bone Morphogenetic Protein 4 (BMP4), WNT3A, or combinations thereof to increase the purity of the CD34+/CD45$^+$ cell population produced. In some embodiments, about 50 ng/ml BMP4, about 50 ng/ml WNT3A, or combinations thereof are added to the culture medium. Culturing can take place on any appropriate surface (e.g., in two-dimensional or three-dimensional culture). The population of cells produced by culturing hemangioblasts as described includes attached cells that adhere to the culture surface and floating hematopoietic progenitor cells. The floating hematopoietic progenitor cells are characterized by a round morphology.

In some cases, the FGF used in both the first and second steps is FGF2. VEGF is a heparin-binding glycoprotein that acts as a specific endothelial cell mitogen. In some cases, the VEGF used in both the first and second steps is VEGF-A (vascular endothelial growth factor A) or an isoform thereof (e.g., VEGF-165). Exemplary human VEGF-A protein sequences include GenBank: AAH65522.2 and GenBank: AAH1 1177.2, and the nucleic acids encoding all, or a non-precursor portion, of VEGF-A are encompassed.

TGFβ receptor inhibitors appropriate for use in a method of the present invention include, without limitation, SB-431542, SB-525334, A83-01, LY2157299, LY210976, GW788388, RepSox, SB-505124, D4476, GW788388, SD208, and EW-7197. Preferably, the inhibitor of TGFβ signaling is SB-431542, a small molecule inhibitor of endogenous activin and the type I receptor (TGFβ Receptor I) (Inman et al., *Mol Pharmacol.* 62(1):65-74 (2002).

Notch is a single-pass cell-surface receptor that binds to a family of cell-surface ligands including the Delta-like and Jagged families. As used herein, the terms "Notch agonist" and "Notch activator" refer to molecules (e.g., biomolecules, small molecules, chemicals) that bind to Notch receptor and initiate or mediate signaling events associated with Notch activation. Resveratrol (3,4',5-trihydroxystilbene) belongs to a class of polyphenolic compounds called stilbenes and is an activator (agonist) of Notch signaling. Other Notch agonists appropriate for use according to methods provided herein for promoting differentiation to HPC include valproic acid and suberoyl bishydroxamic acid. In addition, immobilized or multimerized soluble Notch ligands, such as immobilized DLL4 and immobilized Jagged-1 peptide, also can be used as Notch activators.

Inositol monophosphatase (IMPase) catalyzes the hydrolysis of myo-inositol monophosphates to myo-inositol, which is required in the phosphoinositide cell signaling pathway. In some cases, an inhibitor of IMPase is the biphosphonate L-690,330 ([1-(4-Hydroxyphenoxy)ethylidene]bisphosphonic acid). Lithium also inhibits IMPase to attenuate phosphoinositide signaling (Berridge et al., *Cell* 59:411-419 (1989)). Other inhibitors of the phosphoinositide signaling pathway include, without limitation, phosphoinositide 3-kinase (PI3K) inhibitor Ly294002, Pictilisib, HS-173, GSK2636771, Duvelisib, TG100-115, GSK 1059615, PF-04691502, PIK-93, BGT226, AZD6482, SAR245409, BYL719, CUDC-907, IC-87114, TG100713, Gedatolisib, CH5132799, PKI-402, BAY 80-6946, XL147, PIK-90, PIK-293, PIK-294, Quercetin, Wortmannin, ZSTK474, AS-252424, AS-604850, and Apitolisib.

A suitable working concentration range for chemical inhibitors such as those described herein is from about 0.1 µM to about 100 µM, e.g., about 2 µM, 5 µM, 7 µM, 10 µM, 12 µM, 15 µM, 18 µM, or another working concentration of one or more the foregoing chemical inhibitors between about 0.1 µM to about 100 µM.

For several of the biological markers described herein, expression will be low or intermediate in level. While it is commonplace to refer to cells as "positive" or "negative" for a particular marker, actual expression levels are a quantitative trait. The number of molecules on the cell surface can vary by several logs, yet still be characterized as "positive." Accordingly, characterization of the level of staining permits subtle distinctions between cell populations. Expression levels can be detected or monitored by flow cytometry, where lasers detect the quantitative levels of fluorochrome (which is proportional to the amount of cell surface antigen bound by the antibodies). Flow cytometry or fluorescence-activated cell sorting (FACS) can be used to separate cell populations based on the intensity of antibody staining, as well as other parameters such as cell size and light scatter. Although the absolute level of staining may differ with a particular fluorochrome and antibody preparation, the data can be normalized to a control.

Any appropriate method can be used to detect expression of biological markers characteristic of cell types described herein. For example, the presence or absence of one or more biological markers can be detected using, for example, RNA sequencing (e.g., RNA-seq), immunohistochemistry, polymerase chain reaction, quantitative real time PCR (qRT-PCR), or other technique that detects or measures gene expression. RNA-seq is a high-throughput sequencing technology that provides a genome-wide assessment of the RNA content of an organism, tissue, or cell. Alternatively, or additionally, one may detect the presence or absence of, or measure the level of, one or more biological markers of HPCs using, for example, Fluorescence in situ Hybridization (FISH; see WO98/45479 published October, 1998), Southern blotting, Northern blotting, or polymerase chain reaction (PCR) techniques, such as qRT-PCR. In exemplary embodiments, a cell population obtained according to a method provided herein is evaluated for expression (or the absence thereof) of biological markers of HPCs such as CD34, CD45, CD43, CD49f, and CD90. Preferably, HPCs express one or more of the following hematopoietic progenitor cell markers: CD34, CD45, CD43, CD49f, and CD90. Quantitative methods for evaluating expression of markers at the protein level in cell populations are also known in the art. For example, flow cytometry is used to determine the fraction of cells in a given cell population that express or do not express biological markers of interest.

The terms "defined culture medium," "defined medium," and the like, as used herein, indicate that the identity and quantity of each medium ingredient is known. As used herein, the terms "chemically-defined culture conditions," "fully-defined, growth factor-free culture conditions," and "fully-defined conditions" indicate that the identity and quantity of each medium ingredient is known and the identity and quantity of supportive surface is known. As used herein, the term "albumin-free conditions" indicates that the culture medium used contains no added albumin in any form including, without limitation, Bovine Serum Albumin (BSA), any form of recombinant albumin, or any other animal albumin.

Human pluripotent stem cells (hPSCs), either embryonic or induced, provide access to the earliest stages of human development and offer a platform on which to derive a large number of hematopoietic progenitor cells or blood cells for cellular therapy and tissue engineering. Accordingly, in exemplary embodiments, the methods provided herein further comprise differentiating human pluripotent stem cells under conditions that promote differentiation of mesodermal cells into hematopoietic progenitor cells. A method of producing a hematopoietic progenitor cell comprises culturing human pluripotent stem cells in a serum-free, albumin-free, chemically-defined culture medium that promotes differentiation to mesoderm. In this manner, pluripotent stem cell-derived mesodermal cells are differentiated according to the HPC differentiation methods provided herein, thus producing pluripotent stem cell-derived HPCs. In exemplary embodiments, the serum-free, albumin-free, chemically-defined culture medium that promotes mesoderm differentiation comprises Activin A, Bone Morphogenetic Protein 4 (BMP4), FGF2, and an activator of Wnt/β-catenin signaling.

Defined medium and substrate conditions for culturing pluripotent stem cells, as used in the methods described herein, are well known in the art. The medium used herein are limited only in that they are albumin-free. In some cases, pluripotent stem cells to be differentiated according to the methods disclosed herein are cultured in a serum-free, albumin-free medium.

As will be appreciated by those having ordinary skill in the art, Wnt/β-catenin signaling can be activated by modulating the function of one or more proteins that participate in the Wnt/β-catenin signaling pathway to increase β-catenin expression levels or activity, TCF and LEF expression levels, or β-catenin/TCF/LEF induced transcriptional activity.

In some embodiments, activation of Wnt/β-catenin signaling is achieved by inhibiting Gsk3 phosphotransferase activity or Gsk3 binding interactions. While not wishing to be bound by theory, it is believed that inhibition of Gsk3 phosphorylation of β-catenin will inhibit tonic degradation of β-catenin and thereby increase β-catenin's level and activity to drive differentiation of pluripotent stem cells to an endodermal/mesodermal lineage. Gsk3 inhibition can be achieved in a variety of ways including, but not limited to, providing small molecules that inhibit Gsk3 phosphotransferase activity, RNA interference knockdown of Gsk3, and overexpression of dominant negative form of Gsk3. Dominant negative forms of Gsk3 are known in the art as described, e.g., in Hagen, T. et al. *J Biol Chem*, 277:23330-5 (2002), which describes a Gsk3 comprising a R96A mutation.

In some embodiments, the Wnt/β-catenin signaling pathway is activated by inhibiting Gsk3 in pluripotent stem cells by contacting the pluripotent stem cells with a small molecule that inhibits Gsk3 phosophotransferase activity or Gsk3 binding interactions. Suitable small molecule Gsk3 inhibitors include, but are not limited to, CHIR99021, CHIR98014, BIO-acetoxime, BIO, LiCl, SB216763, SB415286, AR A014418, 1-Azakenpaullone, Bis-7-indolyl-maleimide, and any combinations thereof. In some embodiments, any of CHIR99021, CHIR98014, and BIO-acetoxime are used to inhibit Gsk3 in pluripotent stem cells in the differentiation methods described herein. In one embodiment, the small molecule Gsk3 inhibitor to be used is CHIR99021 at a concentration ranging from about 1 µM to about 9 µM, e.g., about 1 µM, 2 µM, 3 µM, 4 µM, 5 µM, 6 µM, 7 µM, 8 µM, 9 µM or another concentration of CHIR99021 from about 1 µM to about 9 µM. In another embodiment, the small molecule Gsk3 inhibitor to be used is CHIR98014 at a concentration ranging from about 0.1 µM to about 1 µM, e.g., about 0.1 µM, 0.2 µM, 0.3 µM, 0.4 µM, 0.5 µM, 0.6 µM, 0.7 µM, 0.8 µM, 0.9 µM, 1.0 µM or another concentration of CHIR98014 from about 0.1 µM to about 1 µM. In another embodiment, the small molecule Gsk3 inhibitor to be used is BIO-acetoxime at a concentration ranging from about 0.1 µM to about 1 µM, e.g., about 0.1 µM, 0.2 µM, 0.3 µM, 0.4 µM, 0.5 µM, 0.6 µM, 0.7 µM, 0.8 µM, 0.9 µM, 1.0 µM or another concentration of BIO-acetoxime from about 0.1 µM to about 1 µM.

In other embodiments, Gsk3 activity is inhibited by RNA interference knockdown of Gsk3. For example, Gsk3 expression levels can be knocked-down using commercially available siRNAs against Gsk3, e.g., SignalSilence® GSK-3a/β siRNA (catalog #6301 from Cell Signaling Technology®, Danvers, MA), or a retroviral vector with an inducible expression cassette for Gsk3, e.g., a commercially available Tet-inducible retroviral RNAi system from Clontech (Mountain View, CA) Catalog No. 630926, or a cumate-inducible system from Systems Biosciences, Inc. (Mountain View, CA), e.g., the SparQ® system, catalog no. QM200PA-2.

In other embodiments, the Wnt/β-catenin signaling pathway is activated by overexpressing β-catenin itself, e.g., human β-catenin (GenBank Accession Nos: X87838 and CAA61107.1 for nucleotide and protein sequences, respectively). In one embodiment, β-catenin overexpression is inducible β-catenin overexpression achieved using, e.g., any of the just-mentioned inducible expression systems. Alternatively, a constitutively active, stabilized isoform of β-catenin is used, which contains point mutations S33A, S37A, T41A, and S45A as described, e.g., in Baba, Y. et al. Constitutively active β-catenin confers multi-lineage differentiation potential on lymphoid and myeloid progenitors. *Immunity* 23:599-609 (2005).

In yet other embodiments, Wnt/β-catenin signaling pathway activation in pluripotent stem cells is achieved by contacting the cells with an agent that disrupts the interaction of β-catenin with Axin, a member of the β-catenin destruction complex. Disruption of the Axin-β-catenin interaction allows β-catenin to escape degradation though the destruction complex thereby increasing the net level of β-catenin to drive β-catenin signaling. For example, the Axin-β-catenin interaction can be disrupted in pluripotent cells by contacting them with the compound 5-(Furan-2-yl)-N-(3-(1H-imidazol-1-yl)propyl)-1,2-oxazole-3-carboxamide ("SKL2001"), which is commercially available, e.g., as catalog no. 681667 from EMD Biosciences. An effective concentration of SKL2001 to activate Wnt/β-catenin signaling ranges from about 10 µM to about 100 µM, about 20 µM, 30 µM, 40 µM, 50 µM, 60 µM, 70 µM, 80 µM, 90 µM or another concentration of SKL2001 from about 10 µM to about 100 µM. In some embodiments, the activator of Wnt/β-catenin signaling is a Gsk3 inhibitor. In some embodiments, the Gsk3 inhibitor is selected from the group consisting of CHIR99021, CHIR98014, BIO-acetoxime, BIO, LiCl, SB216763, SB415286, AR A014418, 1-Azakenpaullone, and Bis-7-indolylmaleimide. In some embodiments, the Gsk3 inhibitor is CHIR99021 or CHIR98014 at a concentration between about 0.1 µM to about 10 µM in the medium. In one embodiment, the small molecule Gsk3 inhibitor to be used is CHIR99021 at a concentration ranging from about 1 µM to about 9 µM, e.g., about 1 µM, 2 µM, 3 µM, 4 µM, 5 µM, 6 µM, 7 µM, 8 µM, 9 µM or another concentration of CHIR99021 from about 1 µM to about 9 µM. In another embodiment, the small molecule Gsk3 inhibitor to be used is CHIR98014 at a concentration ranging from about 0.1 µM to about 1 µM, e.g., about 0.1 µM, 0.2 µM, 0.3 µM, 0.4 µM, 0.5 µM, 0.6 µM, 0.7 µM, 0.8 µM, 0.9 µM, 1.0 µM or another concentration of CHIR98014 from about 0.1 µM to about 1 µM.

In exemplary embodiments, pluripotent stem cells are cultured in a chemically-defined culture medium comprising or consisting essentially of DMEM/F12 culture medium, L-ascorbic acid-2-phosphate magnesium, sodium selenium, human FGF2, insulin, NaHCO$_3$, transferrin, TGFβ1, BMP4, Activin-A, and CHIR99021 ("E8BAC medium") for two days. Preferably, the culture medium comprises or consists essentially of DMEM/F12 medium; L-ascorbic acid-2-phosphate magnesium (64 mg/l); sodium selenium (14 µg/l); human FGF2 (100 µg/l); insulin (20 mg/l); NaHCO$_3$ (543 mg/l); transferrin (10.7 mg/l); TGFβ1 (2 µg/l); BMP4 (5 ng/mL); Activin A (25 µg/l); and CHIR99021 (1 µM). Human pluripotent stem cells are cultured in the culture medium for about two days. After about two days, at least about 80% (e.g., at least about 80%, 85%, 90%, 95%, 99%) of the resulting cell population are mesoderm cells. As used herein, the term "mesoderm cell" refers to a cell having mesoderm-specific gene expression, capable of differentiating into a mesodermal lineage such as bone, muscle such as cardiac muscle, skeletal muscle and smooth muscle (e.g., of the gut), connective tissue such as the dermis and cartilage, kidneys, the urogenital system, blood or hematopoietic cells, heart and vasculature. Mesoderm-specific biomarkers include Brachyury (T). Culturing can take place on any appropriate surface (e.g., in two-dimensional or three-dimensional culture).

As used herein, "pluripotent stem cells" appropriate for use according to a method of the invention are cells having the capacity to differentiate into cells of all three germ layers. Suitable pluripotent cells for use herein include human embryonic stem cells (hESCs) and human induced pluripotent stem (iPS) cells. As used herein, "embryonic stem cells" or "ESCs" mean a pluripotent cell or population of pluripotent cells derived from an inner cell mass of a blastocyst. See Thomson et al., *Science* 282:1145-1147 (1998). These cells express Oct-4, SSEA-3, SSEA-4, TRA-1-60 and TRA-1-81. Pluripotent stem cells appear as compact colonies comprising cells having a high nucleus to cytoplasm ratio and prominent nucleolus. ESCs are commercially available from sources such as WiCell Research Institute (Madison, Wis.). As used herein, "induced pluripotent stem cells" or "iPS cells" mean a pluripotent cell or population of pluripotent cells that may vary with respect to their differentiated somatic cell of origin, that may vary with respect to a specific set of potency-determining factors and that may vary with respect to culture conditions used to isolate them, but nonetheless are substantially genetically identical to their respective differentiated somatic cell of origin and display characteristics similar to higher potency cells, such as ESCs, as described herein. See, e.g., Yu et al., *Science* 318:1917-1920 (2007).

Induced pluripotent stem cells exhibit morphological properties (e.g., round shape, large nucleoli and scant cytoplasm) and growth properties (e.g., doubling time of about seventeen to eighteen hours) akin to ESCs. In addition, iPS cells express pluripotent cell-specific markers (e.g., Oct-4, SSEA-3, SSEA-4, Tra-1-60 or Tra-1-81, but not SSEA-1). Induced pluripotent stem cells, however, are not immediately derived from embryos. As used herein, "not immediately derived from embryos" means that the starting cell type for producing iPS cells is a non-pluripotent cell, such as a multipotent cell or terminally differentiated cell, such as somatic cells obtained from a post-natal individual.

Human iPS cells can be used according to a method described herein to obtain HPCs having the genetic complement of a particular human subject. For example, it may be advantageous to obtain HPCs that exhibit one or more specific phenotypes associated with or resulting from a particular disease or disorder of the particular mammalian subject. In such cases, iPS cells are obtained by reprogramming a somatic cell of a particular human subject according to methods known in the art. See, for example, U.S. Patent Publication No. 2013/0217117, U.S. Patent Publication No. 2014/0057355, U.S. Pat. Nos. 8,268,620, 8,440,461, Yu et al., *Science* 324(5928):797-801 (2009); Chen et al., *Nat. Methods* 8(5):424-9 (2011); Ebert et al., *Nature* 457(7227): 277-80 (2009); Howden et al., *Proc. Natl. Acad. Sci. U.S.A.* 108(16):6537-42 (2011). Induced pluripotent stem cell-derived HPCs allow modeling of drug responses in tissue constructs that recapitulate vascular tissues in an individual having, for example, a particular disease. Even the safest drugs may cause adverse reactions in certain individuals with a specific genetic background or environmental history. Accordingly, human subject specific iPS cell-derived HPCs are useful to identify genetic factors and epigenetic influences that contribute to variable drug responses.

Subject-specific somatic cells for reprogramming into iPS cells can be obtained or isolated from a target tissue of interest by biopsy or other tissue sampling methods. In some cases, subject-specific cells are manipulated in vitro prior to use in a three-dimensional hydrogel-based tissue construct of the invention. For example, subject-specific cells can be expanded, differentiated, genetically modified, contacted to polypeptides, nucleic acids, or other factors, cryo-preserved, or otherwise modified prior to introduction to a three-dimensional tissue construct.

Medium and substrate conditions for culturing pluripotent stem cells, as used in the methods described herein, are well known in the art. In some cases, pluripotent stem cells to be differentiated according to the methods disclosed herein are cultured in mTESR-1® medium (StemCell Technologies, Inc., Vancouver, British Columbia.), E8 medium, or Essential 8® medium (Life Technologies, Inc.) on a MATRIGEL™ substrate (BD Biosciences, NJ) according to the manufacturer's protocol or on a Corning™ Synthemax™ surface.

Preferably, human pluripotent stem cells (e.g., human ESCs or iPS cells) are cultured in the absence of a feeder layer (e.g., a fibroblast feeder layer), a conditioned medium, or a culture medium comprising poorly defined or undefined components. As used herein, the terms "chemically-defined medium" and "chemically-defined culture medium" also refer to a culture medium containing formulations of fully disclosed or identifiable ingredients, the precise quantities of which are known or identifiable and can be controlled individually. As such, a culture medium is not chemically-defined if (1) the chemical and structural identity of all medium ingredients is not known, (2) the medium contains unknown quantities of any ingredients, or (3) both. Standardizing culture conditions by using a chemically-defined culture medium minimizes the potential for lot-to-lot or batch-to-batch variations in materials to which the cells are exposed during cell culture. Accordingly, the effects of various differentiation factors are more predictable when added to cells and tissues cultured under chemically-defined conditions. As used herein, the term "serum-free" refers to cell culture materials that do not contain serum or serum replacement, or that contains essentially no serum or serum replacement. For example, an essentially serum-free medium can contain less than about 1%, 0.9%, 0.8%, 0.7%, 0.6%, 0.5%, 0.4%, 0.3%, 0.2%, or 0.1% serum. "Serum free" also refers to culture components free of serum obtained from animal (e.g., fetal bovine) blood or animal-derived materials, which is important to reduce or eliminate the potential for cross-species viral or prion transmission. For avoidance of doubt, serum-containing medium is not chemically-defined.

The methods provided herein produce isolated populations of pluripotent stem cell-derived HPCs, where the isolated population is a substantially pure population of HPCs. As used herein, "isolating" and "isolated" refer to separating, selecting, or enriching for a cell type of interest or subpopulation of cells from surrounding, neighboring, or contaminating cells or from cells of another type. As used herein, the term "substantially pure" refers to a population of cells that is at least about 80% (e.g., at least about 80%, 82%, 83%, 85%, 90%, 95%, 96%, 97%, 98%, 99% or more) pure, with respect to HPCs making up a total cell population. In other words, the term "substantially pure" refers to a population of HPCs of the present invention that contains at least about 80% (e.g., at least about 80%, 82%, 83%, 85%, 90%, 95%, 96%, 97%, 98%, 99% or more) of HPCs when directing differentiation to obtain cells of the hematopoietic progenitor cell lineage. The term "substantially pure" also refers to a population of HPCs of the present invention that contains fewer than about 20%, about 10%, or about 5% of non-HPCs in a population prior to any enrichment, expansion step, separation, or selection step. In some cases, a substantially pure isolated population of HPCs generated according to a method provided herein is at least about 95% (e.g., at least about 95%, 96%, 97%, 98%, 99%) pure with respect to HPCs making up a total cell population.

In some embodiments, the proportion of hematopoietic progenitor cells in a population of cells obtained in the described methods is enriched using a cell separation, cell sorting, or enrichment method, e.g., fluorescence activated cell sorting (FACS), enzyme-linked immunosorbent assay (ELISA), magnetic beads, magnetic activated cell sorting (MACS), laser-targeted ablation of non-endothelial cells, and combinations thereof. Preferably, FACS is used to identify and separate cells based on cell-surface antigen expression.

The methods of the present invention provide scalable, inexpensive, and reproducible generation of human HPCs. For instance, after obtaining a cell population comprising human HPCs according to a method described herein, the human HPC population can be expanded in a culture medium appropriate for proliferating human HPCs including, without limitation, E6 medium plus stem cell factor (SCF), or StemSpan™ SFEM plus SCF. In some embodiments SCF is included in the medium at 20 ng/ml.

TABLE 1

Chemically-defined Culture Medium Components

| Medium Name | Protocol Step | Chemically-defined Components |
|---|---|---|
| E8 | | DMEM/F12 medium + L-ascorbic acid-2-phosphate magnesium (64 mg/l); sodium selenium (14 µg/l); |

TABLE 1-continued

Chemically-defined Culture Medium Components

| Medium Name | Protocol Step | Chemically-defined Components |
|---|---|---|
| | | human FGF2(100 μg/l);<br>insulin (20 mg/l);<br>NaHCO₃ (543 mg/l);<br>Transferrin (10.7 mg/l); and<br>TGFβ1 (2 μg/l) |
| E8BAC | Human pluripotent stem cells to mesodermal cells | E8 medium +<br>BMP4 (5 ng/mL);<br>Activin A (25 μg/l); and<br>CHIR99021 (1 μM) |
| E7 | | DMEM/F12 medium +<br>L-ascorbic acid-2-phosphate magnesium (64 mg/l);<br>sodium selenium (14 μg/l);<br>human FGF2 (100 μg/l);<br>insulin (20 mg/l);<br>NaHCO₃ (543 mg/l); and<br>Transferrin (10.7 mg/l) |
| E7BVi | | E7 medium +<br>VEGF-A (50 μg/l);<br>BMP4 (50 μg/l); and<br>SB431542 (5 μM) |
| E7Bi | | E7 medium +<br>BMP4 (50 μg/l); and<br>SB431542 (5 μM) |
| E7Vi | | E7 medium +<br>VEGF-A (50 μg/l); and<br>SB431542 (5 μM) |
| E7V | | E6 medium +<br>FGF2 (100 μg/l); and<br>50 μg/l VEGF-A |
| E6 | | DMEM/F12 medium +<br>L-ascorbic acid-2-phosphate magnesium (64 mg/l);<br>sodium selenium (14 μg/l);<br>insulin (20 mg/l);<br>NaHCO₃ (543 mg/l); and<br>transferrin (10.7 mg/l) |
| E6FVB | | E6 medium +<br>human FGF2(100 μg/l);<br>VEGF-A (50 μg/l); and<br>BMP4 (50 μg/l) |
| E6V | | E6 medium +<br>VEGF-A (50 μg/l) |
| E5 | | DMEM/F12 medium +<br>L-ascorbic acid-2-phosphate magnesium (64 mg/l);<br>sodium selenium (14 μg/l);<br>NaHCO₃ (543 mg/l); and<br>transferrin (10.7 mg/l) |
| FVIRL "Five Factor" | Differentiating pluripotent stem cell-derived mesodermal cells into hemangioblasts | E5 medium +<br>Human FGF2 (100 μg/l)<br>VEGF-165 (50 μg/l)<br>SB431542 (10 μM)<br>RESV (5 μM)<br>L-690,330 (10 μM) |
| FVIRLW | | FVIRL +<br>WNT3A (100 ng/ml) |
| FVIRL-5 | | E5 medium +<br>Human FGF2 (100 μg/l);<br>VEGF-165 (50 μg/l);<br>SB431542 (10 μM);<br>RESV (5 μM); and<br>L-690,330 (5 μM) |
| FVIRL-5-I | | FVIRL-5 +<br>insulin (20 mg/l) |
| FVIRL-5-W | | FVIRL-5 +<br>WNT3A (50 ng/ml) |
| FVIRL-5-BB | | FVIRL-5 +<br>PDGF-BB (100 μg/l) |
| FVIR | | E5 medium +<br>Human FGF2 (100 μg/l);<br>VEGF-165 (50 μg/l);<br>SB431542 (10 μM); and<br>RESV (5 μM) |
| FVR | Differentiating hemangioblasts into hematopoietic progenitor cells | E6 medium +<br>Human FGF2 (100 μg/l);<br>VEGF-165 (50 μg/l);<br>RESV (5 μM) |

TABLE 1-continued

Chemically-defined Culture Medium Components

| Medium Name | Protocol Step | Chemically-defined Components |
|---|---|---|
| VIL | | E5 medium + Human FGF2 (100 μg/l); VEGF-165 (50 μg/l); SB431542 (10 μM); and L-690,330 (10 μM) |
| FVIM | | E5 medium + Human FGF2 (100 μg/l); VEGF-165 (50 μg/l); SB431542 (10 μM); and WNT3A (100 μg/l) |
| FVB | | E5 medium + Human FGF2 (100 μg/l); VEGF-165 (50 μg/l); and BMP4 (50 μg/l) |
| FVI | | E5 medium + Human FGF2 (100 μg/l); VEGF-165 (50 μg/l); and SB431542 (10 μM) |
| FV | | E5 medium + Human FGF2 (100 μg/l) VEGF-165 (50 μg/l) |
| BVIn | | E5 medium + BMP4 (50 μg/l); VEGF-165 (50 μg/l) Insulin (20 mg/l) |
| VI | | E5 medium + VEGF-165 (50 μg/l) SB431542 (5 μM) |
| Control | | E5 medium Human FGF2 (100 μg/l) SB431542 (10 μM) |
| Control + VEGF | | Control medium + VEGF-165 (50 μg/l) |
| Control + RESV | | Control medium + RESV (5 μM) |
| Control + WNT3A | | Control medium + WNT3A (50 μg/l) |

In another aspect, provided herein is a method of obtaining macrophages. In an exemplary embodiment, the floating cells of the cell population comprising hematopoietic progenitor cells are cultured in medium comprising granulocyte-macrophage colony stimulating factor (GM-CSF) for about 3 days. The cells are then cultured in medium comprising interleukin 1 beta (IL-1B), macrophage colony stimulating factor (M-CSF), and either fetal bovine serum (FBS) or knockout serum replacement (KOSR) for about 6 days to obtain a population of cells comprising macrophages. In some embodiments, the population of cells comprises at least about 90% (or at least about 95%) CD11b$^+$ CD14$^+$ macrophages.

In another aspect, provided herein is a method for differentiating Natural Killer (NK) cells from the HPC without the need for added feeder cells. Previous methods described in the art for differentiating NK cells require co-culture with added feeder cells or the addition of bovine serum albumin (Knorr et al., 2013). In an exemplary embodiment, the population of cells comprising hematopoietic progenitor cells produced by the methods described herein is cultured in medium comprising bovine serum albumin (BSA), insulin, and transferrin for about 3 days to produce a population of cells comprising attached cells and floating cells. In some embodiments, the medium is E6 medium comprising BSA, insulin, and transferrin. The floating cells are removed and cultured in medium comprising interleukin 7 (IL-7), interleukin-15 (IL-15), Flt3 ligand (FLT3-L), and SCF to produce a population of cells comprising NK cells. In some embodiments, the medium additionally comprises serum or serum replacement such as knockout serum replacement (KOSR) or BIT9500 serum substitute. In some embodiments, StemSpan™ SFEM medium may be used. In some embodiments, the floating cells are cultured for about 2-3 weeks to produce NK cells. In some embodiments the population of cells comprises at least about 60% (or at least about 65%, at least about 70%, at least about 80%, at least about 85%, at least about 90%, at least about 95%, or at least about 99%) CD56$^+$ CD3$^-$ NK cells.

In another aspect, provided herein is a feeder-free method for differentiating T cells from the hematopoietic progenitor cells produced by the methods described herein. In an exemplary embodiment, the floating cells from the cell population comprising hematopoietic progenitor cells are cultured in T cell medium comprising interleukin 7 (IL-7), Flt3 ligand (FLT3-L), SCF, and a Notch agonist to produce a population of cells comprising CD3$^+$, CD4$^+$, CD8$^+$ T cells. In some embodiments, the cells are cultured for about 30 days to produce the T cell population. The T cells may also express T cell receptor γ/δ (TCR γ/δ). In some embodiments, the T cell medium additionally comprises serum or serum replacement such as knockout serum replacement (KOSR) or BIT9500. In some embodiments, StemSpan™ SFEM medium may be used. In some embodiments, the Notch agonist may be RESV, DLL4, JAG1 or another Notch agonist or activator as described herein. In some embodiments, the methods described herein produce a cell population comprising between about 85% and about 95% (e.g., 85%, 86%, 87%, 88%, 89%, 90%, 91%, 92%, 93%, 94%, or 95%) $CD3^+$, $CD4^+$, $CD8^+$ T cells. T cells produced by the methods described herein may be used in a therapeutic composition for use in treatment methods, such as for use as an allogeneic immune therapy.

As used herein, "feeder-free" refers to culture conditions that are substantially free of a cell feeder layer. Cells grown under feeder-free conditions may be grown on a substrate, such as a chemically-defined substrate, and/or grown as an adherent culture. Suitable chemically-defined substrates include vitronectin.

In another aspect, provided herein are therapeutic compositions including HPCs, macrophages, NK cells, and/or T cells obtained according to methods provided herein and methods of using them for the treatment of subjects. In some embodiments, the HPCs described herein may be used in cancer immunotherapy treatments or in the production of chimeric antigen receptor (CAR) T cells or CAR NK cells.

Chimeric antigen receptors (CARs), also known as chimeric T cell receptors, artificial T cell receptors and chimeric immunoreceptors, are engineered receptors, which graft specificity onto an immune effector cell. In general, a chimeric antigen receptor is a transmembrane protein having a target-antigen binding domain that is fused via a spacer and a transmembrane domain to a signaling endodomain. When the CAR binds its target antigen, an activating signal is transmitted to the T cell or NK cell. In one embodiment, the chimeric antigen receptor or genetically engineered receptor is introduced into the T cell or NK cell. In one embodiment, a nucleic acid vector encoding the chimeric antigen receptor or genetically engineered receptor is transfected into the T cells or NK cells whereby the T cells or NK cells express the chimeric antigen receptor. In some embodiments, a nucleic acid vector encoding the chimeric antigen receptor or genetically engineered receptor is transfected in human pluripotent stem cells, mesoderm cells, hemangioblasts, or hematopoietic progenitor cells for use in any of the methods described herein to produce CAR T cells or CAR NK cells. Methods of making and using CAR T cells and CAR NK cells are described in the art. See, for example, June et al. (June, et al., "CAR T cell immunotherapy for human cancer," Science, 359, 1361-1365, 2018), and Mehta et al. (Mehta et al., "Chimeric antigen receptor expressing natural killer cells for immunotherapy of cancer," Frontiers of Immunology, 9:283, 2018).

In a further aspect, therefore, the present invention provides methods and compositions for cell transplantation, cell replenishment, and cell or tissue replacement and enhancing hematopoiesis. The method can comprise providing to a subject in need thereof a therapeutically effective amount of hematopoietic progenitor cells derived according to methods provided herein, whereby providing hematopoietic progenitor cells treats the subject. Disorders requiring cell or tissue replacement and improving hematopoiesis include, without limitation, hematologic disease, such as, hemoglobinopathy, neutropenia, thrombocytopenia, anemia, thalassemia, polycythemia, uremia, myelofibrosis, myeloma, myelodysplasia, leukemia, lymphoma, myelodysplastic syndrome, Von Willebrand disease, hemophilia, primary thrombocythemia, an acquired platelet function disorder, a plasma cell disorder, a solid tumor and any other disorder or disease for which the stricken individual would benefit from hematopoietic regenerative medicine or a hematopoietic progenitor cell transplant. Preferred individual subjects according to the present invention are mammals including, without limitation, humans and non-human primates, as well as canines, felines, ovines, porcines, equines, and bovines. In some cases, a substantially pure population of hematopoietic progenitor cells is obtained using a pluripotent cell (e.g., induced pluripotent stem cell) of the subject in need of treatment. However, a substantially pure population of hematopoietic progenitor cells also can be obtained using pluripotent stem cells of, preferably, a syngeneic or allogeneic donor. Less preferably, a xenogeneic donor is used.

Any appropriate dosage can be used for a therapeutic method provided herein. The cell dose will depend on the extent and severity of the blood disorder or disease but a suitable range is from about $1 \times 10^8$ cells/patient to about $1 \times 10^{10}$ cells/patient per dose. In some cases, HPCs obtained as described herein are co-administered to a subject with other cell types including, for example, macrophages, T cells, or NK cells.

After administering the cells into the subject, the effect of the treatment method may be evaluated, if desired, using any appropriate method known to practitioners in the art. The treatment may be repeated as needed or required. Following treatment according to the methods provided herein, the treated subject can be monitored for any positive or negative changes in blood disorder or disease being treated. In a preferred embodiment, an increase in the production of blood cells is a result of engraftment of HPCs following administration of the said cells.

Administration of a therapeutically effective amount of HPCs into the recipient subject is generally effected using methods well known in the art, and usually involves directly injecting or otherwise introducing a therapeutically effective dose of HPCs into the subject using clinical tools known to those skilled in the art (e.g., U.S. Pat. Nos. 6,447,765; 6,383,481; 6,143,292; and 6,326,198). For example, introduction of HPCs of the present invention can be effected locally or systemically via intravascular administration, such as intravenous, intramuscular, or intra-arterial administration, intraperitoneal administration, and the like. Cells can be injected into an infusion bag (e.g., Fenwal infusion bag (Fenwal, Inc.)) using sterile syringes or other sterile transfer mechanisms. The cells can then be immediately infused via IV administration over a period of time, such as 15 minutes, into a free flow IV line into the patient. In some embodiments, additional reagents such as buffers or salts are provided to the recipient subject concurrently with the cells.

In exemplary embodiments, HPCs of the present invention are provided to the subject as a pharmaceutical composition comprising the cells and one or more pharmaceutically acceptable carriers, buffers, or excipients. The pharmaceutical composition for administration must be formulated, produced, and stored according to standard methods that provide proper sterility and stability. A pharmaceutical composition of the present invention may also comprise one or more growth factors or cytokines (e.g., angiogenic cytokines) that promote the survival or engraftment of transplanted cells, promote angiogenesis, modulate the composition of extracellular or interstitial matrix, and/or recruit other cell types to the site of transplantation.

Compositions

In another aspect, provided herein are preparations of HPCs. For example, provided herein are HPCs, substantially purified populations of HPCs, pharmaceutical preparations comprising HPCs, and cryopreserved preparations of the HPCs. The HPCs described herein may be substantially free of at least one protein, molecule, or other impurity that is found in its natural environment (e.g., "isolated"). The HPCs may be mammalian, including, human HPCs. The invention also provides human HPCs, a substantially purified population of human HPCs, pharmaceutical preparations comprising human HPCs, and cryopreserved preparations of the human HPCs. The preparation may be a preparation comprising human embryonic stem cell-derived HPCs, human iPS cell-derived HPCs, and substantially purified (with respect to non-HPCs) preparations comprising differentiated pluripotent stem cell-derived HPCs.

Cell preparations provided herein are useful for various in vitro and in vivo applications such as hematopoietic progenitor cell transplantation, blood disease modeling, and screening for drugs affecting hematopoiesis such as hematopoietic growth factors, erythropoietics, and colony-stimulating factors. The disclosed methods facilitate production and use of HPC populations.

In another aspect, provided herein is a genetically engineered HPC produced by the methods described herein. Also provided herein is a genetically engineered T cell differentiated from an HPC produced by the methods described herein. In some embodiments, the genetically engineered T cell is a CAR T cell. In some embodiments, provided herein is a genetically engineered NK cell differentiated from an HPC produced by the methods described herein. In some embodiments, the genetically engineered NK cell is a CAR NK cell. In some embodiments, provided herein is a genetically engineered macrophage differentiated from an HPC produced by the methods described herein.

As used herein, the terms "genetically engineered" and "genetically modified" are used interchangeably and refer to a cell (e.g., prokaryotic or eukaryotic cell) that has been modified to comprise a non-naturally occurring nucleic acid molecule that has been created or modified by the hand of man (e.g., using recombinant DNA technology) or is derived from such a molecule (e.g., by transcription, translation, etc.). An HPC, T cell, NK cell, or macrophage that contains an exogenous, recombinant, synthetic, and/or otherwise modified polynucleotide is considered to be a genetically modified cell and, thus, non-naturally occurring relative to any naturally occurring counterpart. In some cases, genetically modified cells contain one or more recombinant nucleic acids. In other cases, genetically modified cells contain one or more synthetic or genetically engineered nucleic acids (e.g., a nucleic acid containing at least one artificially created insertion, deletion, inversion, or substitution relative to the sequence found in its naturally occurring counterpart). Procedures for producing genetically engineered cells are generally known in the art, for example, as described in Sambrook et al, *Molecular Cloning, A Laboratory Manual* (*Fourth Edition*), Cold Spring Harbor Press, Cold Spring Harbor, N.Y. (2012) and Doudna et al, *CRISPR-Cas, A Laboratory Manual*, Cold Spring Harbor Press, Cold Spring Harbor, N.Y. (2016), each of which is incorporated herein by reference.

In some cases, a cell's genome is modified (e.g., engineered) so that functional proteins encoded by either the class II or both the class I and the class II major histocompatibility complex genes do not appear on the cell's surface. See, for example, Deuse et al. (Deuse et al., "Hypoimmunogenic derivatives of induced pluripotent stem cells evade immune rejection in fully immunocompetent allogenic recipients," Nature Biotechnology, vol. 37, 252-258, 2019)

In this way, the modified cells are more likely to evade attack by T-cells of a recipient. In some cases, cells are genetically modified (engineered) as described in U.S. Pat. No. 6,916,654. In other cases, it may be advantageous to produce immune non-responsive cells from iPS cells by disrupting beta-2 microglobulin as described by as U.S. Patent Pub. 2014/0134195. For example, a cell can be modified to comprise a genetically engineered disruption in the cell's endogenous beta-2 microglobulin (B2M) gene. As described in U.S. Patent Pub. 2014/0134195, the genetically engineered disruption can comprise introducing one or more polynucleotide sequences capable of encoding a single chain fusion human leukocyte antigen (HLA) class I protein comprising at least a portion of the B2M protein covalently linked, either directly or via a linker sequence, to at least a portion of a human leukocyte antigen (HLA)-I chain. It will be understood, however, that methods of obtaining "universal" human AECs are not limited to modifying HLA proteins. Other strategies can also be used to genetically modify cells to minimize the immune response. For example, Riolobos et al. (*Molecular Therapy* 2013, 21(6):1232-1241) described producing stable HLA-I negative human pluripotent cells by making targeted disruptions in both alleles of the Beta-2 Microglobulin (B2M) gene using recombinant adeno-associated virus (rAAV)-mediated gene editing. The resulting $B2M^{-/-}$ pluripotent stem cells could be differentiated using any of the methods described herein. In another example, genetic modifications that wholly or partially disrupt expression of CD58 on the cell surface have been shown to increase escape from immune recognition by both arms of cellular immunity. See, e.g., Challa-Malladi et al. (*Cancer Cell* 2011; 20(6):728-740). Also, HLA-E-expressing pluripotent stem cells (Edimer cells) evade allogeneic responses and lysis by NK cells (Gornalusse et al., *Nat Biotechnol.* 2017; 35(8):765-772).

Preparations comprising HPCs useful for clinical applications must be obtained in accordance with regulations imposed by governmental agencies such as the U.S. Food and Drug Administration. Accordingly, in exemplary embodiments, the methods provided herein are conducted in accordance with Good Manufacturing Practices (GMPs), Good Tissue Practices (GTPs), and Good Laboratory Practices (GLPs). Reagents comprising animal derived components are not used, and all reagents are purchased from sources that are GMP-compliant. In the context of clinical manufacturing of a cell therapy product, such as in vitro populations of human hematopoietic progenitor cells, GTPs govern donor consent, traceability, and infectious disease screening, whereas the GMP is relevant to the facility, processes, testing, and practices to produce a consistently safe and effective product for human use. See Lu et al. *Stem Cells* 27: 2126-2135 (2009). Where appropriate, oversight of patient protocols by agencies and institutional panels is envisioned to ensure that informed consent is obtained; safety, bioactivity, appropriate dosage, and efficacy of products are studied in phases; results are statistically significant; and ethical guidelines are followed.

In another aspect, provided herein is a set of culture medium or a culture system comprising a first culture medium for differentiating human pluripotent stem cell-derived mesodermal cells into hemangioblasts, where the first culture medium comprises or consists essentially of an FGF, a VEGF, an inhibitor of TGFβ signaling (e.g., SB431542), a Notch agonist (e.g., Resveratrol (RESV)), and an inhibitor of inositol monophosphatase, and a second culture medium for differentiating hemangioblasts into HPCs, wherein the second culture medium comprises or consists essentially of insulin, a FGF, a VEGF, and a Notch agonist. In exemplary embodiments, the first culture medium comprises or consists essentially of E5 medium supplemented with human FGF2 (100 µg/l), VEGF-165 (50 µg/l), SB431542 (10 µM), RESV (5 µM), and L-690,330 (10 µM). In exemplary embodiments, the second culture medium comprises or consists essentially of a FGF, a VEGF, and a Notch agonist ((e.g., Resveratrol (RESV)).

In some aspects, the culture medium comprises, or consists essentially of, an FGF, a VEGF, an inhibitor of TGFβ signaling (e.g., SB431542), a Notch agonist (e.g., Resveratrol (RESV)), and an inhibitor of inositol monophosphatase. The FGF (e.g., FGF2) may be present in the culture medium at a concentration between about 10 ng/ml and about 200 ng/ml (e.g., 10 ng/ml, 20 ng/ml, 30 ng/ml, 40 ng/ml, 50 ng/ml, 60 ng/ml, 70 ng/ml, 80 ng/ml, 90 ng/ml, 100 ng/ml, 125 ng/ml, 150 ng/ml, 175 ng/ml, or 200 ng/ml). In some embodiments, 100 ng/ml FGF2 is included in the culture medium. The VEGF (e.g., VEGF-A or an isoform such as VEGF-165) may be present in the culture medium at a concentration between about 1 ng/ml and about 100 ng/ml (e.g., 1 ng/ml, 5 ng/ml, 10 ng/ml, 15 ng/ml, 20 ng/ml, 30 ng/ml, 50 ng/ml, 60 ng/ml, 75 ng/ml, 80 ng/ml, 90 ng/ml, or 100 ng/ml). In some embodiments, 50 ng/ml VEGF-165 or VEGF-A is included in the culture medium. The inhibitor of TGFβ signaling may be, but is not limited to, SB-431542, SB-525334, A83-01, LY2157299, LY210976, GW788388, RepSox, SB-505124, D4476, GW788388, SD208, and EW-7197. The TGFβ inhibitor may be present in the culture medium at a concentration between about 5 μM and about 15 μM (e.g., 5 μM, 6 μM, 7 μM, 8 μM, 9 μM, 10 μM, 11 μM, 12 μM, 13 μM, 14 μM, or 15 μM). In some embodiments, the culture medium includes 10 μM SB431542. The Notch agonist may be, but is not limited to, Resveratrol (RESV, 3,4',5-trihydroxystilbene), valproic acid, and suberoyl bishydroxamic acid. The Notch agonist may be present in the culture medium at a concentration between about 1 μM and about 10 μM (e.g., 1 μM, 2 μM, 3 μM, 4 μM, 5 μM, 6 μM, 7 μM, 8 μM, 9 μM, or 10 μM). In some embodiments, the culture medium includes 5 μM RESV. The inhibitor of inositol monophosphatase may be, but is not limited to, biphosphonate L-690,330 ([1-(4-Hydroxyphenoxy)ethylidene]bisphosphonic acid), lithium, phosphoinositide 3-kinase (PI3K) inhibitor Ly294002, Pictilisib, HS-173, GSK2636771, Duvelisib, TG100-115, GSK1059615, PF-04691502, PIK-93, BGT226, AZD6482, SAR245409, BYL719, CUDC-907, IC-87114, TG100713, Gedatolisib, CH5132799, PKI-402, BAY 80-6946, XL147, PIK-90, PIK-293, PIK-294, Quercetin, Wortmannin, ZSTK474, AS-252424, AS-604850, and Apitolisib. The inhibitor of inositol monophosphatase may be present in the culture medium at a concentration between about 5 μM and about 15 μM (e.g., 5 μM, 6 μM, 7 μM, 8 μM, 9 μM, 10 μM, 11 μM, 12 μM, 13 μM, 14 μM, or 15 μM).

In some embodiments, the culture medium includes 10 μM L-690,330. In some embodiments, the culture medium additionally includes DMEM/F12 culture medium, L-ascorbic acid-2-phosphate magnesium, sodium selenium, NaHCO₃, and transferrin. In some embodiments, the culture medium comprises or consists essentially of DMEM/F12 medium, L-ascorbic acid-2-phosphate magnesium (64 ng/ml), sodium selenium (14 ng/ml), NaHCO₃ (543 μg/ml), transferrin (10.7 μg/ml), FGF2 (100 ng/ml), VEGF-A (50 ng/ml), SB431542 (10 μM), RESV (5 μM), and L-690,330 (10 μM).

Articles of Manufacture

The invention also provides a kit for differentiating human pluripotent stem cells into HPCs, comprising (i) a first culture medium suitable for differentiation of human pluripotent stem cells into mesodermal cells; (ii) a second culture medium suitable for differentiation of pluripotent stem cell-derived mesodermal cells into hemangioblasts; (iii) a third culture medium suitable for differentiation of hemangioblasts into HPCs and (iv) instructions describing a method for differentiating human pluripotent stem cells into HPCs, the method employing the first culture medium, the second culture medium, and the third culture medium.

Unless defined otherwise, all technical and scientific terms used herein have the same meaning as commonly understood by one of ordinary skill in the art to which the invention belongs. Although any methods and materials similar to or equivalent to those described herein can be used in the practice or testing of the present invention, the preferred methods and materials are described herein.

In the specification and in the claims, the terms "including" and "comprising" are open-ended terms and should be interpreted to mean "including, but not limited to . . . ." These terms encompass the more restrictive terms "consisting essentially of" and "consisting of." As used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising," "including," "characterized by," and "having" can be used interchangeably.

As used herein, "a medium consisting essentially of" means a medium that contains the specified ingredients and those that do not materially affect its basic characteristics.

As used herein, "effective amount" means an amount of an agent sufficient to evoke a specified cellular effect according to the present invention.

As used herein, "about" means within 5% of a stated concentration range, density, temperature, or time frame.

The present invention has been described in terms of one or more preferred embodiments, and it should be appreciated that many equivalents, alternatives, variations, and modifications, aside from those expressly stated, are possible and within the scope of the invention.

Example 1

The embodiment described here demonstrates the large-scale production of hematopoietic progenitor cells and demonstrates the engraftment of said cells into mice.

The transition of endothelial cells into hematopoietic cells involves dramatically reduced cell-cell contact. However, the role of cell-cell contact in hematopoietic cell fate determination remains unclear. Here, we disrupted the cell-cell contact by seeding cells in low density. The results demonstrated that human pluripotent stem cells provided at high cell density differentiated into arterial endothelial cells, while human pluripotent stem cells provided at low cell density differentiated into hemangioblasts. Further investigation revealed that low cell density activated the BMP signaling pathway to promote HPC formation. These hematopoietic progenitor cells could be further differentiated to macrophages, NK (natural killer) cells, and T cells in feeder-free and serum-free conditions. Our study provides new insights about endothelium-to-hemangioblast transition and an efficient protocol for generating hematopoietic progenitor cells.

Figure 9:
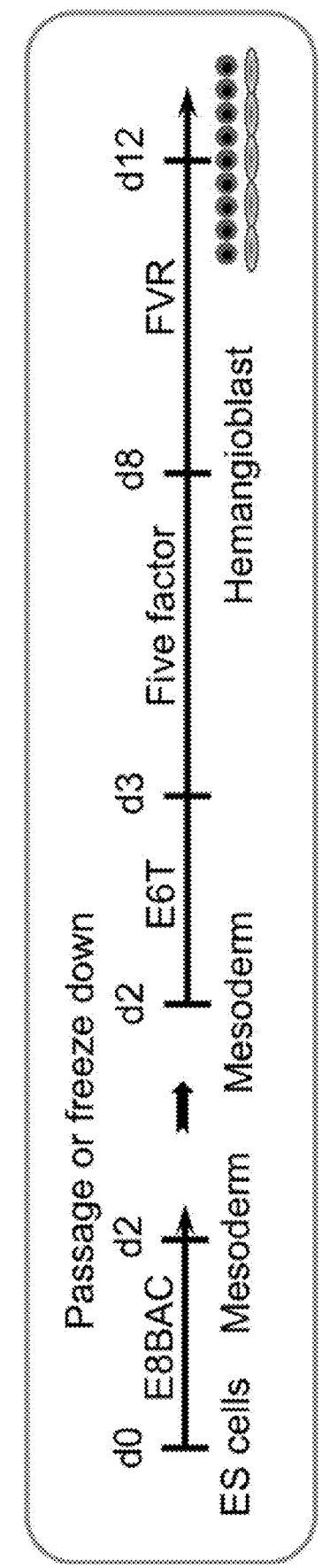
FIG. 9 shows an alternative method for generating hematopoietic progenitor cells. ES/iPS cells were cultured in E8BAC medium for 2 days (44 hours) ($1.1\times10^5$ cells/cm$^2$). The cells could be cryopreserved after this length of time. For further differentiation, the cells were passaged (1:6 ratio) in E6T medium (add 10 LM Y-27632) and cultured for 18 hours. The medium was then changed to "five factor" medium until day 8. From day 8 to day 12, the culture was maintained in FVR medium. Hematopoietic cells could be cryopreserved at day 12.

Cell-cell contact regulates arterial endothelial cells and hemangioblast cell fate determination—Endothelial-to-hematopoietic stem cell transition occurs in aorta-gonad-mesonephros region. We therefore investigated whether human pluripotent stem cell-derived arterial endothelial cells can be reprogrammed into hematopoietic stem cells. To mimic the diminished cell-cell contact during the endothelial-to-hematopoietic stem cell transition, we disrupted the cell-cell contact by seeding cells at low density. The "five factor" arterial endothelial cell differentiation protocol was used for the first six days (Zhang et al., 2017, also see U.S. Patent Publication No. 2016/0244719) (FIG. 1A). The medium was switched to FVR and cultured for another three to four days. Hematopoietic cells were observed in the low cell density culture, but not in the high cell density culture (FIG. 1B). These cells expressed hematopoietic progenitor cell markers CD34 and CD45 (FIG. 1C). In contrast, endothelial cell marker CD144, was reduced (FIG. 1D). The results indicated the generation of hematopoietic progenitor cells. The hematopoietic progenitor cells were also generated from H9 ES and PBMC-3-1 iPS cell lines (FIG. 1E). Finally, we were able to generate $4\times10^8$ HPCs from 1 TripleFlask (FIG. 1F) in 10 days. The hematopoietic cells could be cryopreserved (90% FBS+10% DMSO) at day 10. The results suggest that the protocol was suitable for large-scale clinical application. Results also demonstrated that HPCs can be generated using cryopreserved mesoderm cells (FIG. 9).

Figures 2A, 2B, 2C, 2D:
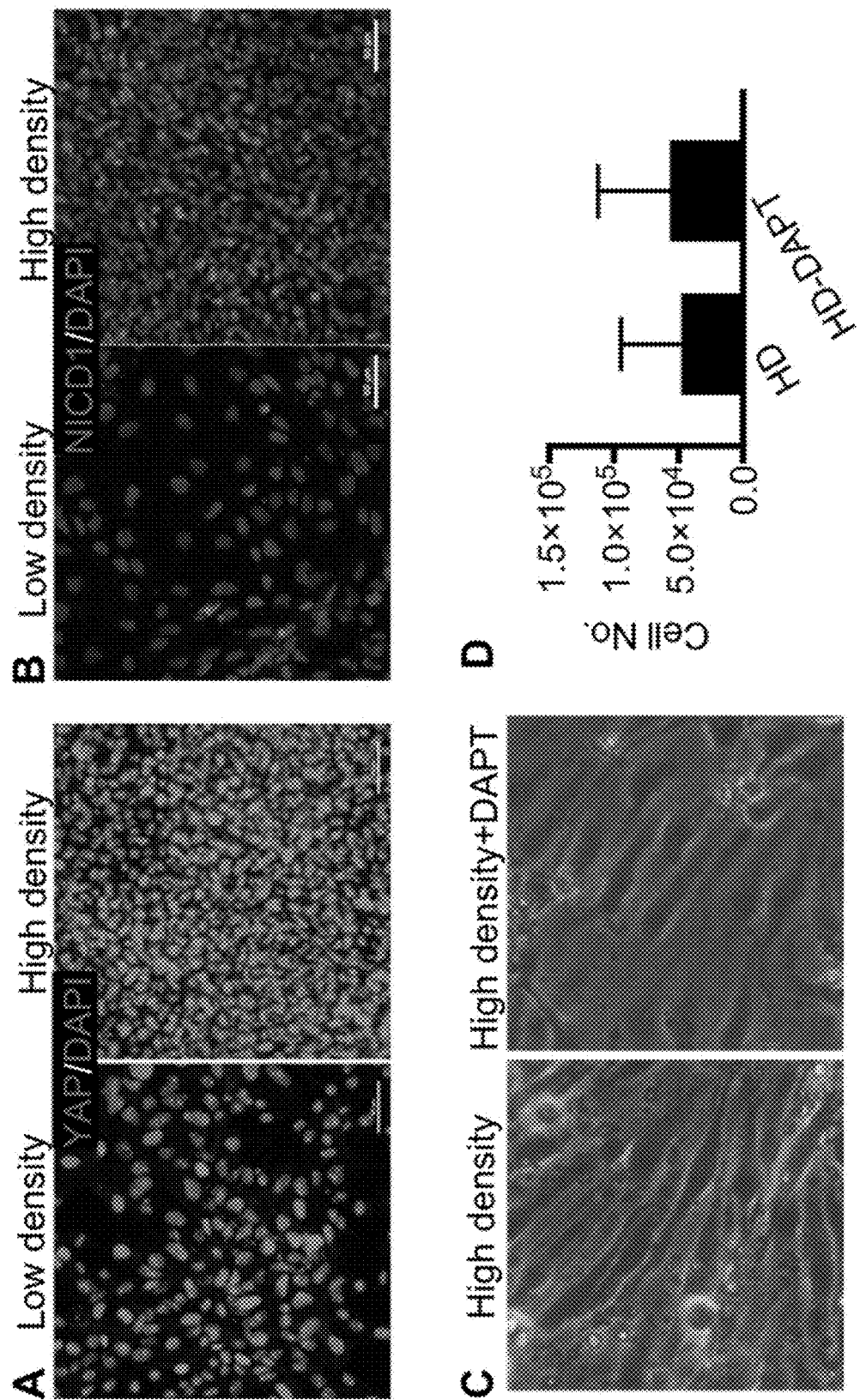
FIG. 2A-2D show Notch and YAP signaling in the low and high density cell cultures.

Seeding at low cell density activates BMP signaling to promote endothelium to hemangioblast transition—NOTCH and YAP signaling are two key pathways regulated by cell-cell contacts (Bray, 2016; Pan, 2010). Our results demonstrated that YAP expression and nuclear translocation were similar in both low and high cell density cultures (FIG. 2A). Interestingly, although activated NOTCH1 (NICD1) was largely reduced in low cell density compared to high cell density (FIG. 2B), inhibiting of NOTCH signaling did not promote hematopoietic-like cell formation in high cell density (FIGS. 2C&D). These results suggested that low cell density regulated other pathways to promote hematopoiesis.

Figures 3A, 3B, 3C, 3D, 3E:
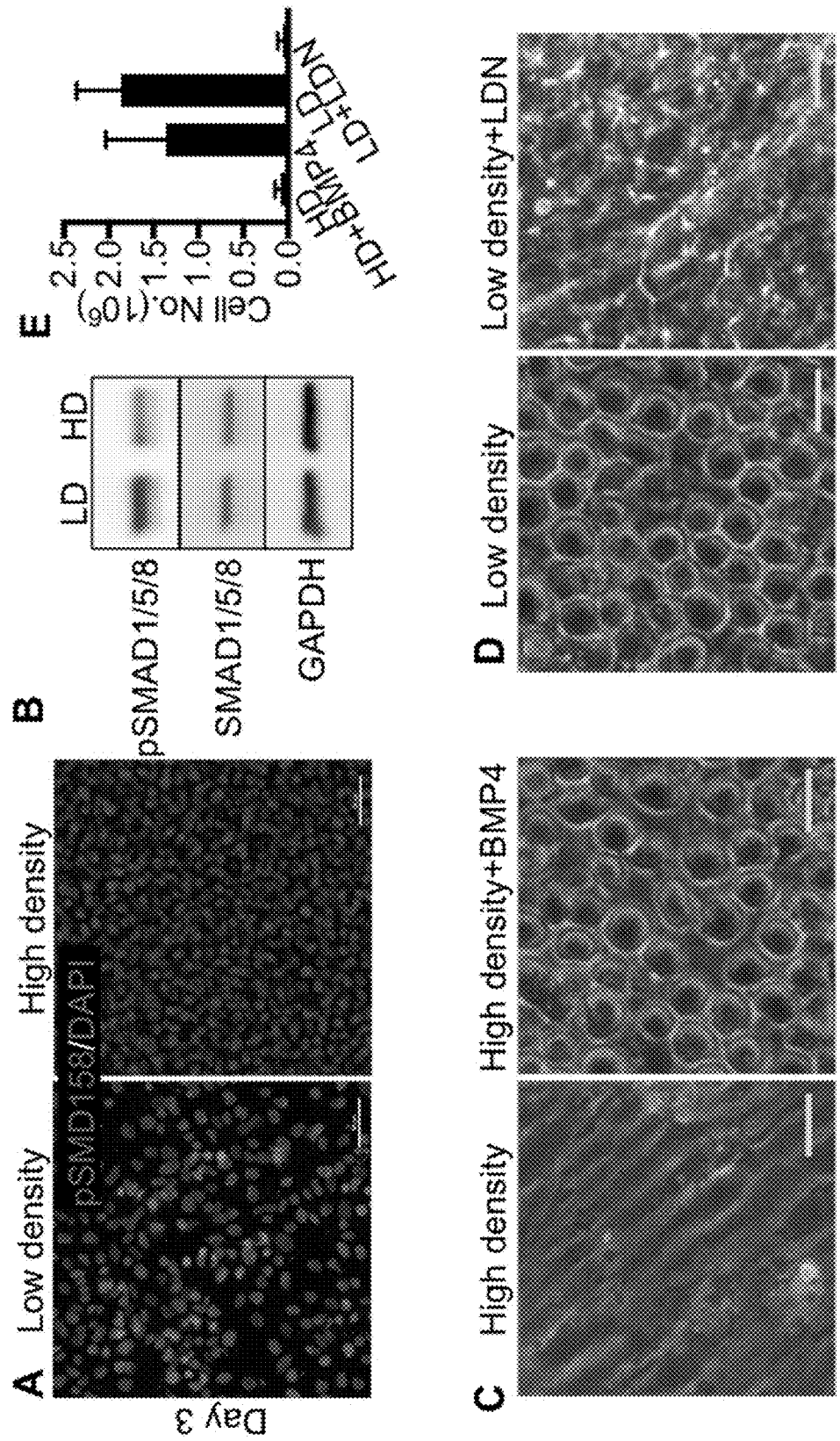
FIGS. 3A-3E show BMP4 signaling in the low and high density cell cultures.

Since BMP4 signaling was required for hematopoiesis (Goldman et al., 2009; Wang and Nakayama, 2009), we examined the BMP4-SMAD1/5/8 pathway. Phosphorylated SMA1/5/8 were greatly increased in low cell density, as demonstrated by both immunostaining and western blot (FIGS. 3A&B). More importantly, adding BMP4 promoted hematopoiesis in high cell density, while inhibiting BMP4 signaling by LDN reduced hematopoiesis in low cell density (FIG. 3C-E). The results indicated that reducing cell-cell interaction increased BMP4 signaling pathway to induce hematopoiesis from arterial endothelial cells.

Figure 4:
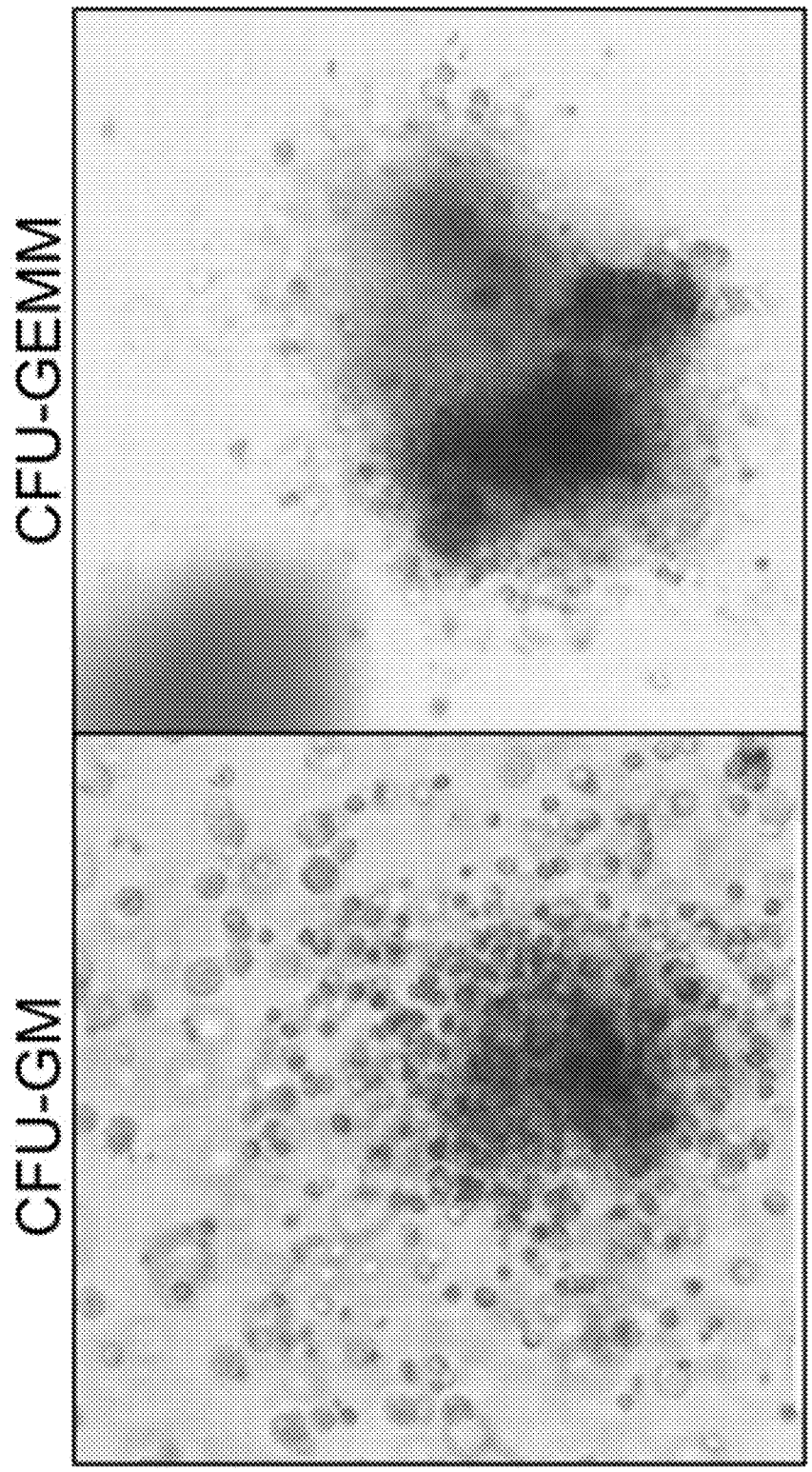
FIG. 4 shows the results of a colony-forming unit assay. Day 10 hematopoietic cells were mixed with MethoCult™ and cultured for 2 weeks.

Differentiation of hematopoietic progenitor cells into macrophages—To test the differentiation potential of these hematopoietic cells, the floating cells were collected from the culture at day 10. Colony-forming unit (CFU) assay revealed the existence of GM (granulocytes and monocytes/macrophages) and GEMM (granulocytes, erythrocytes, and monocytes/macrophages) colonies (FIG. 4), indicating the multi-potency of hematopoietic progenitor cells.

Figures 5A, 5B, 5C, 5D:
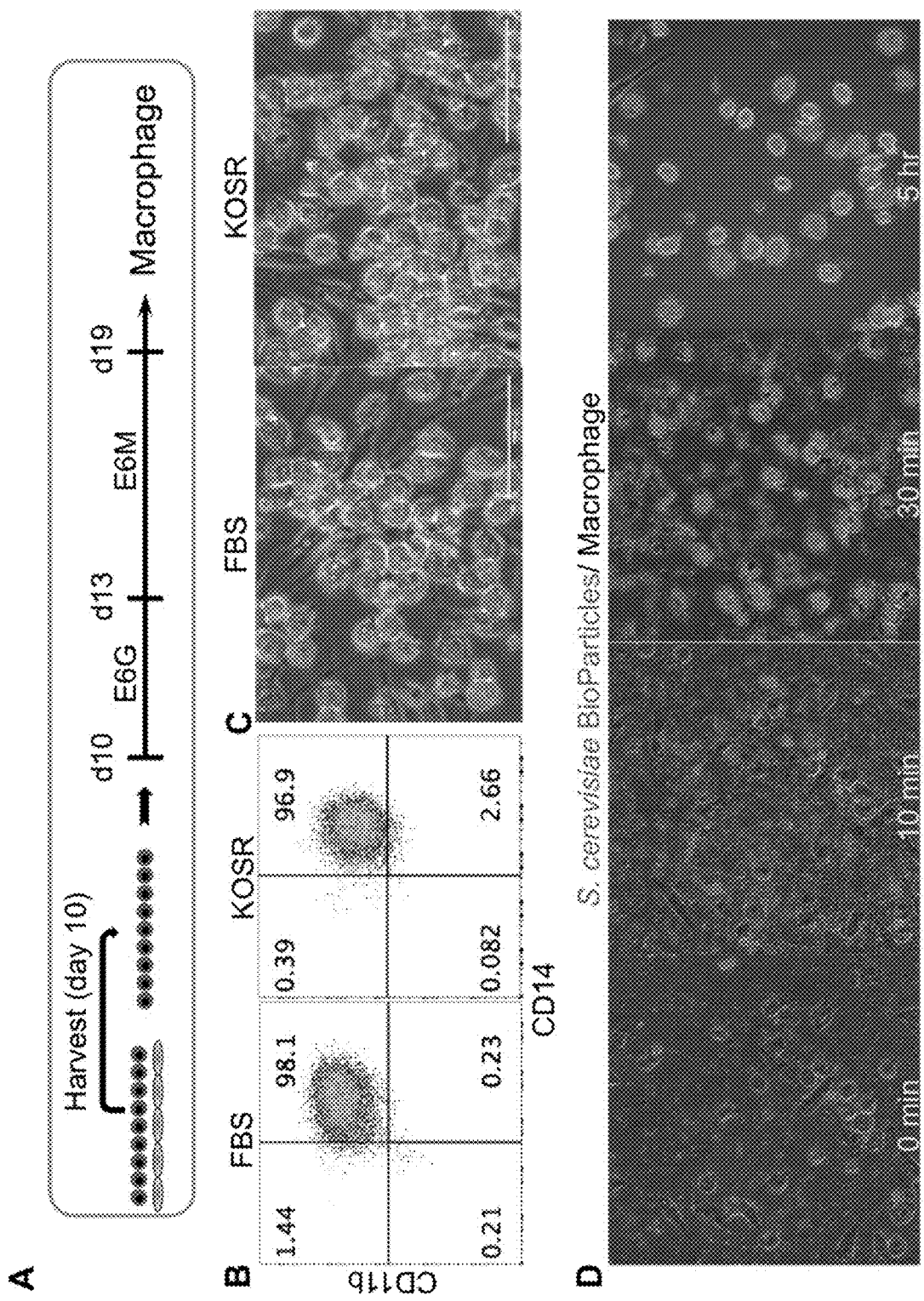
FIGS. 5A-5D show differentiation of hematopoietic progenitor cells into macrophages.

Next, we tested whether these cells could be differentiated into macrophages. The cells were cultured in E6G medium for 3 days and them E6M medium (supplemented with 10% FBS or KOSR) for another 6 days (FIG. 5A). The protocol generated more than 95% of $CD11b^+CD14^+$ macrophages (FIGS. 5B&C). Phagocytosis analysis revealed these macrophages were able to take up bacteria particles (FIG. 5D), demonstrating that these macrophages were functional.

Differentiation of hematopoietic progenitor cell into NK cells—NK cells have been used for cancer therapy. NK cells do not cause GvHD (graft-versus-host disease) or other alloimmune reactions, providing a potential universal source of allogenic cell therapy (Mehta and Rezvani, 2018). Given the advantage, chimeric antigen receptor (CAR)-engineered NK cells have been widely studied for curing various cancers.

Figures 6A, 6B, 6C:
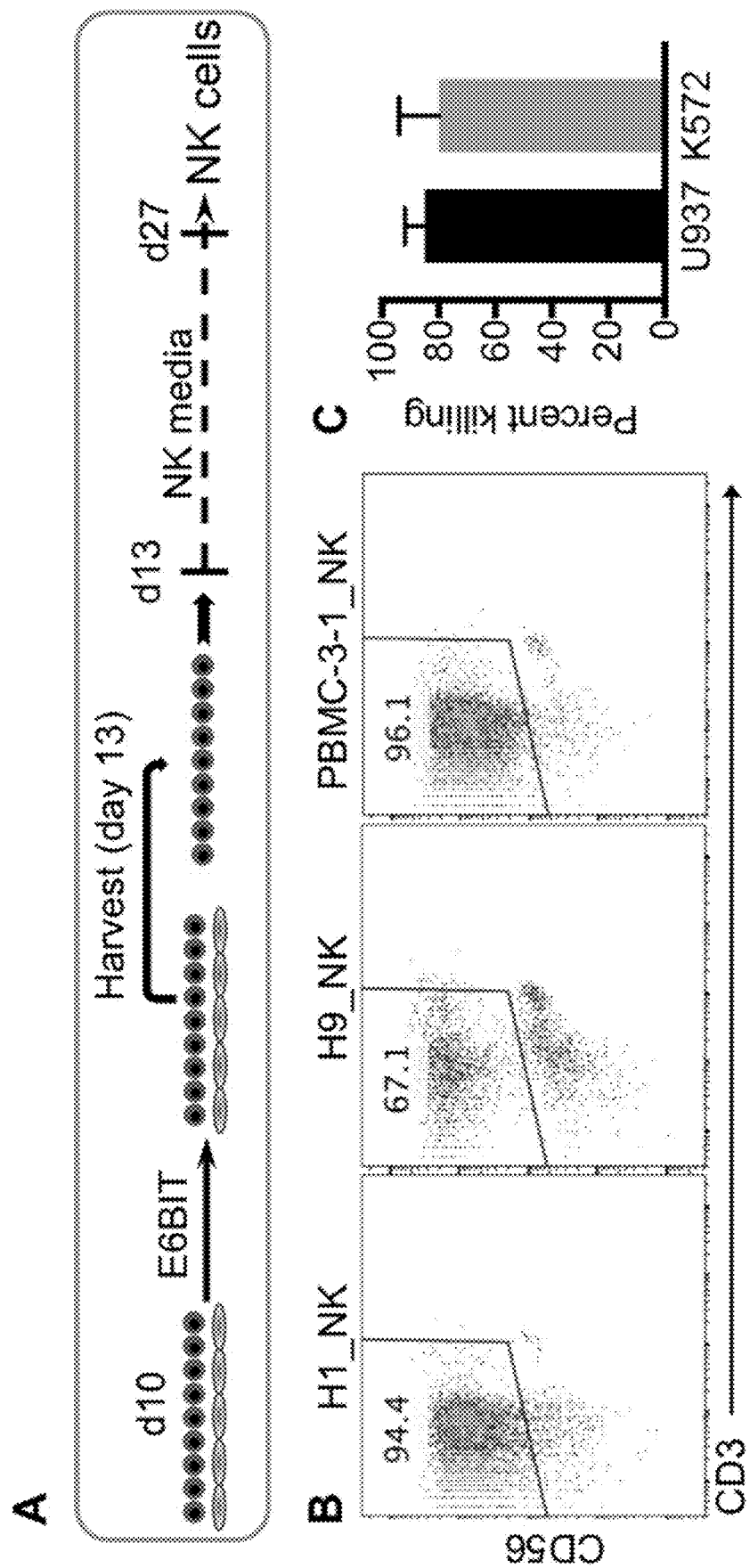
FIGS. 6A-6C show differentiation of hematopoietic progenitor cells into Natural Killer (NK) cells.

Previous protocols for generating NK cells from human pluripotent stem cells required co-culture with feeder cells. Kaufman's group removed the feeder cells, but bovine serum was still required for the differentiation protocol (Knorr et al., 2013). In addition, $CD34^+CD45^+$ cells need to be sorted out in order to perform NK cell differentiation (Knorr et al., 2013). Here, we aimed to remove serum and avoid the purification step of $CD34^+CD45^+$ cells during the differentiation. The cells (including attached and floating cells) from day 10 were further cultured in E6BIT medium for another 3 days (FIG. 6A). The floating cells were then transferred to a new plate and cultured in NK medium for 2-3 weeks (FIG. 6A), which yielded 67-96% $CD56^+CD3^-$ NK cells across three ES/iPS cell lines (FIG. 6B). We then evaluated H1 derived NK cell mediated cytolytic activity against tumor cells. The results demonstrated that 75% of K562 (a leukemic cell line) and U937 (monocytes derived from lymphoma patient) cells were killed by hESC-NK cells (FIG. 6C).

Figures 7A, 7B:
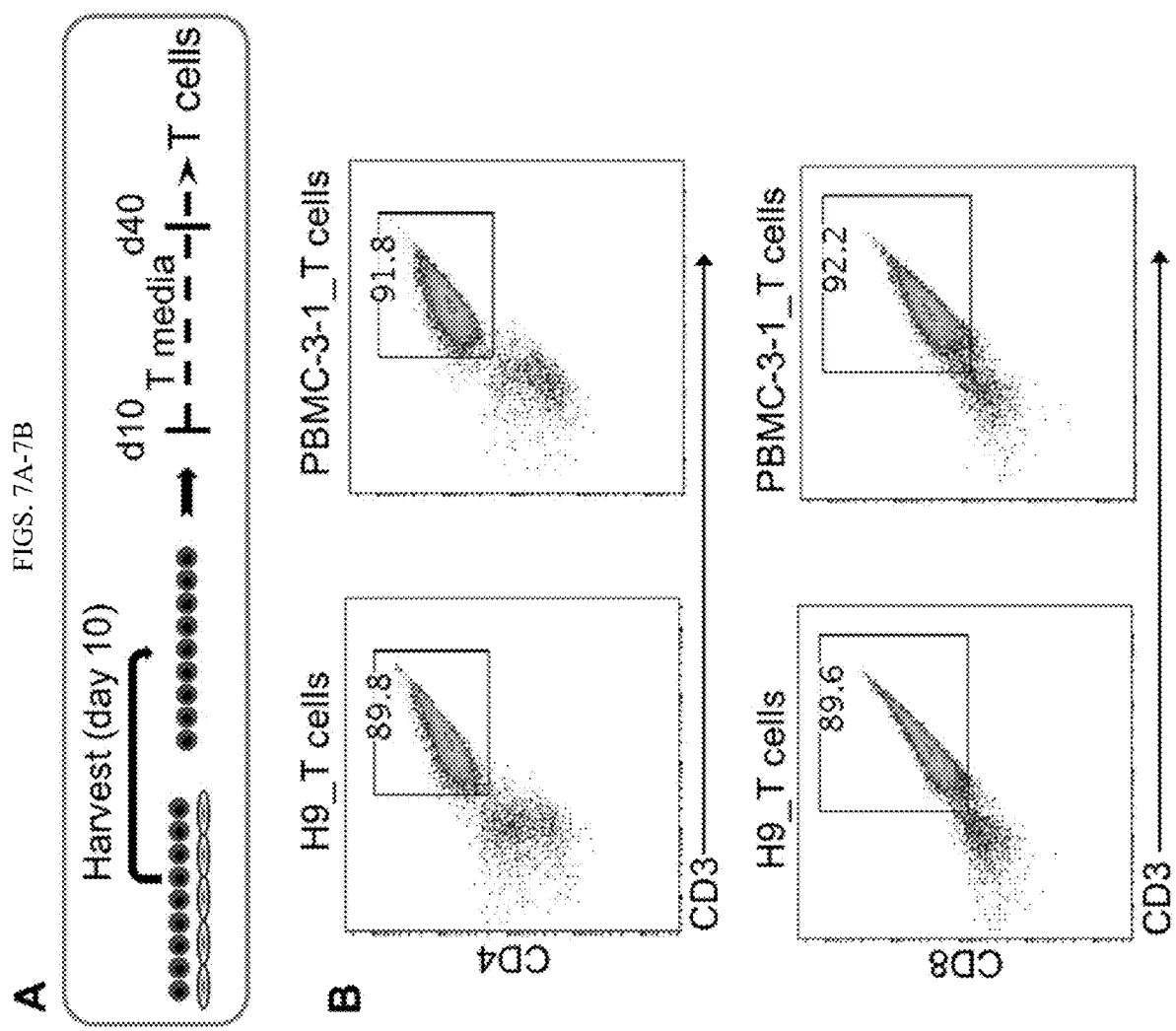
FIGS. 7A-7B show differentiation of hematopoietic progenitor cells into T cells.

Differentiation of hematopoietic progenitor cells into T cells—Generating T cells from ES/iPS cells for immune therapy is a promising new treatment for hematological and non-hematological cancer. Currently, feeder cells are used to direct differentiation of human pluripotent stem cells into T cells, which is not suitable for clinical application. Here, we generated a feeder-free and serum-free protocol for T cell differentiation. The floating cells were collected from day 10 and cultured in T medium for another 30 days (FIG. 7A). Flow cytometry analysis revealed that 30-50% of cells expressed CD3, CD4, and CD8, suggesting the T cell formation (FIG. 7B). These T cells also expressed T cell receptor $\gamma/\delta$ (TCR $\gamma/\delta$) (FIG. 7B). The protocol worked for 3 different cell lines, including H1 and H9 ES cells and PBMC-3-1 iPS cells (FIG. 7B).

TCR $\gamma\delta$ T cells are becoming of increasing interest in allogeneic cell therapy (Handgretinger and Schilbach, 2018; Wu et al., 2017). TCR $\alpha\beta$ T cells are primarily used for cancer immune therapy, due to the high abundance (accounting for approximately 95% of all T cells) in human. However, TCR $\alpha\beta$ T cells recognize exogenous pathogen specific ligands or endogenous stress-induced ligands in a MHC (major histocompatibility complex)-dependent manner, thus will cause GvHD when applied to allogeneic therapy. In contrast, $\gamma\delta$ T cells are not alloreactive and do not cause GvHD. Therefore, our protocol provides a potential cell source for large-scale allogeneic ("off-the shelf") immune therapy.

Figures 8A, 8B, 8C:
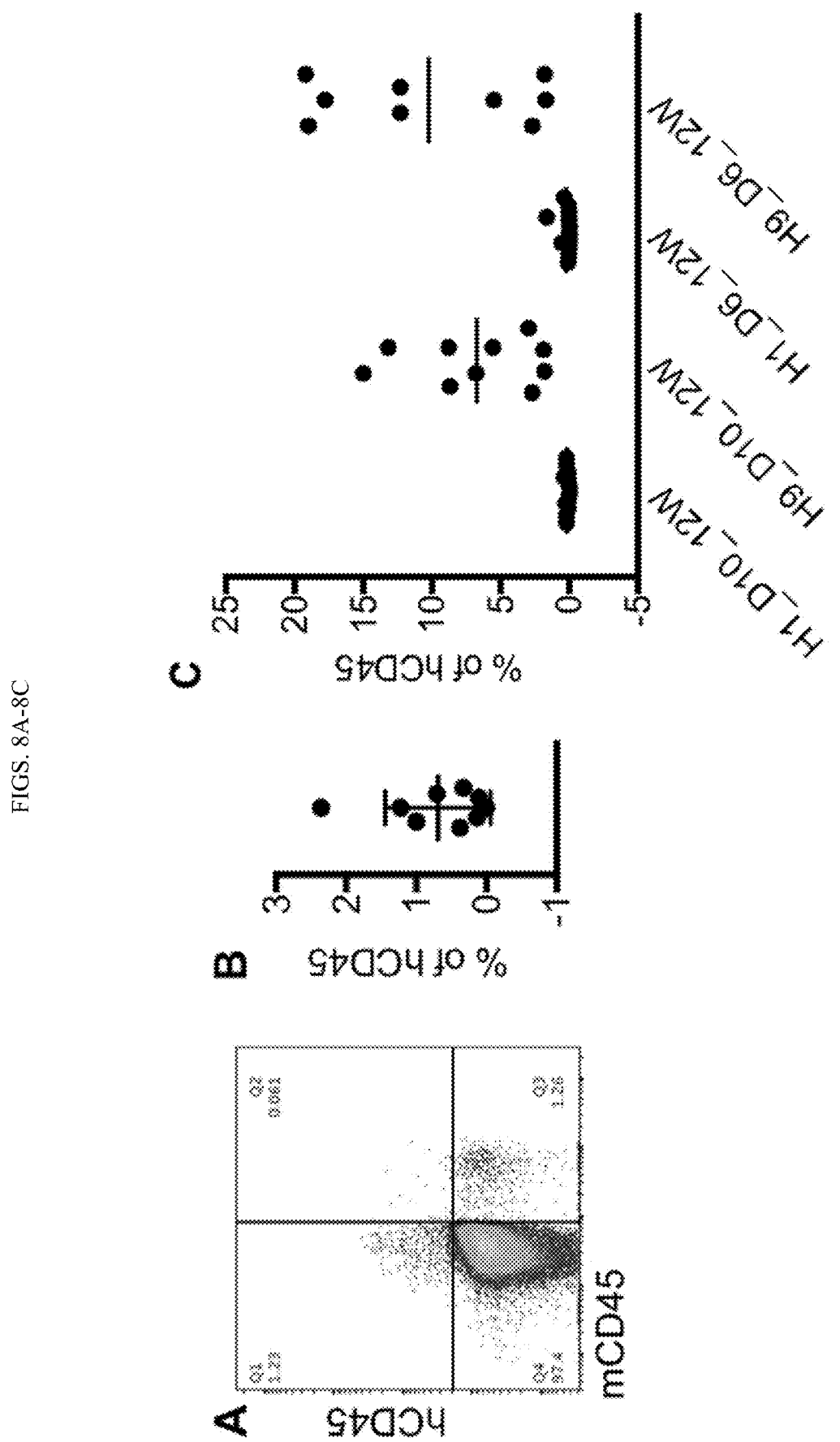
FIGS. 8A-8C show in vivo engraftment of hematopoietic progenitor cells.

In vivo engraftment of hematopoietic progenitor cells—The generation of hematopoietic stem/progenitor cells is a promising way to treat blood disorders, but this goal remains challenging. Two recent studies used transgenic methods to generate hematopoietic cells capable of engrafting in an immune-compromised mouse (Lis et al., 2017; Sugimura et al., 2017). However, the transgenic methods cannot be scaled up for large-scale clinical application. Here, we were able to generate $4\times10^8$ hematopoietic progenitor cells from 1 TripleFlask in 10 days (FIG. 1F). The day 10 hematopoietic progenitor cells were injected intravenously into NBSGW mice. Human $CD45^+$ cells were detected in the peripheral blood 8 weeks after injection (FIG. 8A). Three out of 9 mice showed more than 1% of human $CD45^+$ cells engraftment (FIG. 8B). As sex may play a role in transplant success, we compared hematopoietic progenitor cells derived from H1 (male) and H9 (female) ES cells. The result demonstrated that H9-derived hematopoietic progenitor cells have much higher engraftment efficiency compared to H1-derived hematopoietic progenitor cells (FIG. 8C). The average engraftment efficiency was improved from 6% to 10% when using cells harvested and cryopreserved at an earlier stage, for example day 6 (FIG. 8C). To the best of our knowledge, this is the best engraftment efficiency for hematopoietic progenitor cells derived from ES/iPS cells reported to date.

Medium Components—Components and compositions of the media used in this example are outlined in the tables below.

TABLE 2

Medium Components

| Media components | E8 | E8BAC | E6 | Five factor | FVR |
|---|---|---|---|---|---|
| DMEM/F12 | + | + | + | + | + |
| Ascorbic acid (64 mg/l) | + | + | + | + | + |
| Sodium selenium (14 µg/L) | + | + | + | + | + |
| NaHCO$_3$ (543 µg/mL) | + | + | + | + | + |
| Transferrin (10.7 µg/mL) | + | + | + | + | + |
| Insulin (20 µg/mL) | + | + | + | | + |
| FGF2 (100 µg/L) | + | + | | + | + |
| TGFβ1 (2 µg/L) | + | + | | | |
| BMP4 (5 µg/L) | | + | | | |
| Activin A (25 µg/L) | | + | | | |
| CHIR99021 (1 µM) | | + | | | |
| VEGF-A$_{165}$ (50 µg/L) | | | | + | + |
| SB431542 (10 µM) | | | | + | |
| RESV (5 µM) | | | | + | + |
| L690 (10 µM) | | | | + | |

TABLE 3

E6G and E6M Medium Components

| Media components | E6G | E6M |
|---|---|---|
| Base media | E6 | E6 |
| GM-SCF (200 ng/mL) | + | |
| IL-1B (10 ng/mL) | | + |
| M-CSF (20 ng/mL) | | + |

TABLE 4

T Medium

| T media | |
|---|---|
| Base medium | E6 |
| IL-7 | 5 ng/ml |
| FLT3-L | 5 ng/ml |
| SCF | 10 ng/ml |
| RESV | 5 µM |
| KOSR | 10% |

TABLE 5

E6BIT Medium

| E6BIT | |
|---|---|
| Base medium | E6 |
| BIT9500 | 20% |

TABLE 6

NK Medium

| NK medium | |
|---|---|
| Base medium | E6 |
| IL-7 | 20 ng/ml |
| IL-15 | 10 ng/ml |
| SCF | 20 ng/ml |
| FLT3-L | 10 ng/ml |
| KOSR | 10% |

REFERENCES

1. Bray, S. J. (2016). Notch signalling in context. Nat Rev Mol Cell Biol 17, 722-735.
2. Goldman, D. C., Bailey, A. S., Pfaffle, D. L., Al Masri, A., Christian, J. L., and Fleming, W. H. (2009). BMP4 regulates the hematopoietic stem cell niche. Blood 114, 4393-4401.
3. Handgretinger, R., and Schilbach, K. (2018). The potential role of gammadelta T cells after allogeneic HCT for leukemia. Blood 131, 1063-1072.
4. Knorr, D. A., Ni, Z., Hermanson, D., Hexum, M. K., Bendzick, L., Cooper, L. J., Lee, D. A., and Kaufman, D. S. (2013). Clinical-scale derivation of natural killer cells from human pluripotent stem cells for cancer therapy. Stem Cells Transl Med 2, 274-283.
5. Lis, R., Karrasch, C. C., Poulos, M. G., Kunar, B., Redmond, D., Duran, J. G. B., Badwe, C. R., Schachterle, W., Ginsberg, M., Xiang, J., et al. (2017). Conversion of adult endothelium to immunocompetent haematopoietic stem cells. Nature 545, 439-445.
6. Mehta, R. S., and Rezvani, K. (2018). Chimeric Antigen Receptor Expressing Natural Killer Cells for the Immunotherapy of Cancer. Front Immunol 9, 283.
7. Pan, D. (2010). The hippo signaling pathway in development and cancer. Dev Cell 19, 491-505.
8. Sugimura, R., Jha, D. K., Han, A., Soria-Valles, C., da Rocha, E. L., Lu, Y. F., Goettel, J. A., Serrao, E., Rowe, R. G., Malleshaiah, M., et al. (2017). Haematopoietic stem and progenitor cells from human pluripotent stem cells. Nature 545, 432-438.
9. Wang, Y., and Nakayama, N. (2009). WNT and BMP signaling are both required for hematopoietic cell development from human ES cells. Stem Cell Res 3, 113-125.
10. Wu, D., Wu, P., Qiu, F., Wei, Q., and Huang, J. (2017). Human gammadeltaT-cell subsets and their involvement in tumor immunity. Cell Mol Immunol 14, 245-253.
11. Zhang, J., Chu, L. F., Hou, Z., Schwartz, M. P., Hacker, T., Vickerman, V., Swanson, S., Leng, N., Nguyen, B. K., Elwell, A., et al. (2017). Functional characterization of human pluripotent stem cell-derived arterial endothelial cells. Proc Natl Acad Sci USA 114, E6072-E6078.

We claim:

1. A method for obtaining CD34+ CD45+ hematopoietic progenitor cells, the method comprising: culturing human pluripotent stem cells (hPSCs) at a low density seeding, wherein the low density seeded hPSCs are seeded at a density of between about $6 \times 10^3$ to about $3 \times 10^4$ cells/cm$^2$ in a first serum-free, albumin-free, chemically-defined culture medium for about 2 days, whereby a cell population comprising mesoderm cells is obtained, wherein the mesoderm cells exhibit increased SMAD1/5/8 phosphorylation compared to mesoderm cells obtained from high density seeded hPSCs, wherein the high density seeded hPSCs are seeded at a density of between about $6 \times 10^4$ to about $3 \times 10^5$ cells/cm$^2$ and cultured in a condition comprising the first serum-free, albumin-free, chemically-defined culture medium for about 2 days; culturing the mesoderm cells in a second chemically-defined culture medium that comprises fibroblast growth factor 2 (FGF2), vascular endothelial growth factor A (VEGF-A), a Notch agonist, a TGFβ inhibitor, and an inhibitor of inositol monophosphatase for about 6 days, whereby a cell population comprising hemangioblast cells is obtained; and culturing the hemangioblast cells in a third chemically-defined culture medium that comprises insulin, FGF2, VEGF-A, and the Notch agonist for about 3-4 days, whereby a cell population comprising CD34+ CD45+ hematopoietic progenitor cells is obtained, wherein the Notch agonist is selected from the group consisting of Resveratrol (3,4',5 trihydroxystilbene), valproic acid, or suberoyl bishydroxamic acid, wherein the TGFβ inhibitor is SB431542, and wherein the inhibitor of inositol monophosphatase is L-690,330 ([1-(4-Hydroxyphenoxy)ethylidene]bisphosphonic acid).

2. The method of claim 1, wherein the mesoderm cells express one or more mesodermal marker selected from the group consisting of Brachyury (T), EMOS, FOXA2, MIXL1, MSX1, and MSX2.

3. The method of claim 1, wherein the first serum-free, albumin-free chemically-defined cell culture medium comprises Bone Morphogenetic Protein 4 (BMP4), Activin A, and an activator of Wnt/β-catenin signaling.

4. The method of claim 1, wherein the human pluripotent stem cells are selected from the group consisting of human embryonic stem cells and human induced pluripotent stem cells.

5. The method of claim 1, wherein the low density seeded human pluripotent stem cells are seeded at a density of about $1 \times 10^4$ cells/cm$^2$.

6. The method of claim 3, wherein the activator of Wnt/β-catenin signaling is a Gsk3 inhibitor.

7. The method of claim 6, wherein the Gsk3 inhibitor is selected from the group consisting of CHIR99021, CHIR98014, BIO-acetoxime, BIO, LiCl, SB216763, SB415286, AR A014418, 1-Azakenpaullone, and Bis-7-indolylmaleimide.

8. The method of claim 1, wherein the low density seeded human pluripotent stem cells are seeded at a density of about $2.0 \times 10^4$ cells/cm$^2$.

* * * * *